(12) United States Patent
Rakuljic et al.

(10) Patent No.: US 6,795,182 B2
(45) Date of Patent: Sep. 21, 2004

(54) DIFFRACTIVE FOURIER OPTICS FOR OPTICAL COMMUNICATIONS

(75) Inventors: George Rakuljic, Santa Monica, CA (US); Anthony S. Kewitsch, Santa Monica, CA (US); Victor Leyva, Pasadena, CA (US)

(73) Assignee: Arroyo Optics, Inc., Santa Monica, CA (US)

( * ) Notice: Subject to any disclaimer, the term of this patent is extended or adjusted under 35 U.S.C. 154(b) by 105 days.

(21) Appl. No.: 10/187,855

(22) Filed: Jul. 3, 2002

(65) Prior Publication Data

US 2003/0011769 A1 Jan. 16, 2003

Related U.S. Application Data

(60) Provisional application No. 60/303,759, filed on Jul. 6, 2001, and provisional application No. 60/347,964, filed on Nov. 7, 2001.

(51) Int. Cl.[7] .................................................. G01J 3/28
(52) U.S. Cl. ....................................................... 356/328
(58) Field of Search ................................. 356/328, 334; 398/79, 82–84; 385/37

(56) References Cited

U.S. PATENT DOCUMENTS

| | | | |
|---|---|---|---|
| 2,922,331 A | 1/1960 | Fastie | |
| 5,339,177 A | 8/1994 | Jenkins | |
| 5,450,378 A | 9/1995 | Hekker | |
| 5,724,165 A | 3/1998 | Wu | |
| 5,808,763 A | 9/1998 | Duck | |
| 5,886,785 A | * 3/1999 | Lefevre et al. | ............. 356/328 |

(List continued on next page.)

FOREIGN PATENT DOCUMENTS

EP         1126294 A2     8/2001

OTHER PUBLICATIONS

Fastie, W.G., Sinton, W.M.; Multiple Diffraction in Grating Spectroscopy; J. Optical Society of America, Vo. 44, No. 2, Feb. 1954.

Jenkins, F.A.;Alvarez, I.W.; Successive Diffractions by a Concave Grating; J. Optical Society of America; vol. 42, No. 10, Oct. 1952.

(List continued on next page.)

*Primary Examiner*—F. L. Evans
*Assistant Examiner*—Kara Geisel
(74) *Attorney, Agent, or Firm*—Jones, Tullar & Cooper, P.C.

(57) ABSTRACT

Systems and methods for modifying, switching, rearranging or otherwise controlling the individual wavelength components of DWDM optical signals are described, which employ compact refolding and reshaping of these dimensionally patterned beams within a confined volume. The wavelength components of the beam are diffractively dispersed with high diffraction efficiency, and then reversely converged to beam waists incident on different ones of an array of control elements such as liquid crystal cells, MEMs and other spatial light modulators, or fixed distributed patterns. With reflective control elements the wavelength components may be reversely refolded along reciprocal paths with rediffraction, to form a reconstituted and revised DWDM output signal. If the control elements transmit at least one of the wavelength components, a separate, adjacent three dimensional beam refolding path, with rediffraction, is used to feed recombined signals to a separate output. High diffraction efficiency and minimal optical aberrations are achieved by employing a diffraction grating and opposed Mangin mirror system as the principal elements for beam refolding. The approach is useful in systems servicing narrow channel separations, and in a wide variety of applications including channel equalization, interleaving, channel blocking, and channel grouping.

98 Claims, 13 Drawing Sheets

U.S. PATENT DOCUMENTS

| | | |
|---|---|---|
| 5,907,404 A | 5/1999 | Marron |
| 6,016,197 A | 1/2000 | Krivoshlykov |
| 6,111,674 A | 8/2000 | Bhagavatula |
| 6,137,933 A | 10/2000 | Hunter |
| 6,249,364 B1 | 6/2001 | Martin |
| 6,271,917 B1 * | 8/2001 | Hagler ........................ 356/326 |
| 6,275,623 B1 | 8/2001 | Brophy |
| 6,597,452 B1 * | 7/2003 | Jiang et al. .................. 356/334 |
| 6,636,306 B2 * | 10/2003 | He et al. ..................... 356/328 |

OTHER PUBLICATIONS

White, J.U., Alpert, N.L., Debell, A.G.; Infrared Grating Spectrophotometer; J. Optical Society of America; vol. 47, No. 5; May 1957.

* cited by examiner

DIFFRACTIVE FOURIER OPTICS FOR OPTICAL COMMUNICATIONS

REFERENCES TO RELATED APPLICATIONS

This application relies for priority on provisional application No. 60/303,759 of George A. Rakuljic, filed Jul. 6, 2001 and entitled "Diffractive Fourier Optics for Optical Communications" and provisional application No. 60,347, 964 of George Rakuljic et al., filed Nov. 7, 2001 and entitled "Optical Communication Beam Control Units and Systems and Methods Using the Same."

FIELD OF THE INVENTION

This invention relates to systems and methods for separating, modifying or combining wavelength multiplexed signals in optical communications, and more particularly to such systems and methods for controlling, modulating, switching or otherwise manipulating individual wavelength signals in dense wavelength division multiplexed beams.

BACKGROUND OF THE INVENTION

New and demanding problems in optical communications constantly arise for dense wavelength division multiplexing (DWDM) based transmission at high data rates, dense channel spacings and high channel counts. These problems include combining, separating, filtering, attenuating and switching any or all of the wavelength channels in an optical fiber. There is a need for new devices that perform these functions with wide, flat passbands, low channel crosstalk, precise attenuation, and high channel extinction. In addition, these functions should be performed while maintaning low insertion loss, low polarization dependent loss, and low chromatic dispersion. As channel spacings decrease from 100 GHz down to 50 GHz and less, new challenges in achieving these requirements are constantly introduced. Furthermore, it is highly desirable that the functions be effected within a low profile and small footprint package and that the components and systems be readily manufacturable by conventional processes, so that the resulting systems are cost effective and commercially viable.

Prior art techniques for providing some, but not all of these functions use fiber Bragg gratings, thin film filters, planar waveguides and diffraction gratings. While these approaches may individually satisfy a subset of these requirements, they have limited capability for satisfying all. For example, the application of diffraction gratings to DWDM devices have been thus far limited due to passband roll-off, high insertion loss, challenges in stable fiber-to-free space coupling, and physically large size.

The use of diffractive optics in free space spectrometers, for example, is well known, as described in U.S. Pat. No. 2,922,331 to W. G. Fastie et al. (1960) and an article by Fastie et al., entitled "Multiple Diffraction in Grating Spectroscopy", Journal of the Optical Society of America, Vol. 44, No. 2, February 1954. In U.S. Pat. No. 2,922,331, Fastie et al. describe a wavelength dispersive device obtained by propagating an optical beam onto a diffraction grating, forming the wavelength spectrum at the Fourier plane defined by a separate focusing mirror system, and modifying the individual beam elements comprising the emergent wavelength spectrum. The object light source, shared reflector with effective focal length f, diffraction grating, and image/analysis plane, wherein the distances between the elements are equal to f, comprise what is known in the art as a 4-f spectrometer.

Early work on spectrometric applications using diffractive optics is to be found in various references, such as "Successive Diffractions by a Concave Grating", Jenkins et al., Journal of the Optical Society of America, Vol. 42, No. 10, October 1952, pp. 699–705 and "Infrared Grating Spectrophotometer" by J. U. White et al., Journal of the Optical Society of America, Vol. 47, No. 5, May 1957, pp. 358–376. In later developments, Bouevitch et al. describe, in European Patent Application EP 1126294A2, published Oct. 22, 2001, and in counterpart U.S. Publication No. 2002/0009257A1, the use of diffractive optics in an "Optical Configuration for a Dynamic Gain Equalizer and a Configurable Add/Drop Multiplexer", to modify the signals by such elements as liquid crystal elements, MEMS reflectors, and the like. Emphasis is placed on the 4-f optical system without, however, distinguishing from the substantial earlier work on 4-f spectrometers or fiber coupled spectrometers. Similar to the prior art descriptions, the optical path is folded in the dispersion plane (two dimensional fold) rather than out of the dispersion plane (three dimensional fold). At present, designs and techniques to extend the spectrometer to ultrastable, compact and high performance fiberoptic components have not yet been adequately disclosed.

The invention described herein discloses numerous design features and fabrication approaches specifically tailored for and necessitated by the demanding optical and mechanical requirements of fiberoptic devices. These devices comprise a family of components including dynamic channel equalizers, gain equalizers, band splitters, interleavers, and dynamic add/drop multiplexers. A multiport, wavelength selective, multi-channel variable attenuator and blocker component is the basis of this family of devices. The key features of this component include a unique three dimensional folded optical design, an imaging configuration which improves on the 4-f configuration, optimized anamorphic optics for polarization management, compactness and stability, high performance liquid crystal spatial light modulators (LC-SLMs), and precision alignment processes.

SUMMARY OF THE INVENTION

A compact, high optical efficiency system and method for manipulating multi-wavelength optical wavelength signals is based upon three-dimensional refolding, high resolution imaging and modification of wavelength dispersed beams within a compact volume with high optical efficiency. Tracing the beam through the optical system, the DWDM optical signal is first transformed from the fiber mode into an anamorphically shaped, free space propagating beam by a novel micro-optic system. The beams are reflected at slightly different elevations off opposing and spaced apart reflecting and diffractive surfaces so as to converge and focus to asymmetrically shaped, sagittally dispersed individual wavelength components which are separated and projected at the plane of an array of control elements. These control elements may be either dynamic or static, may reflect or transmit, or both, wherein the modified individual wavelength signals are subsequently rediffracted and reimaged into the symmetrical fiber modes for re-launch into the same or another fiber(s). The beam refolding paths may be reversely directed through the same reflecting and diffractive surfaces or through a set of adjacent elements. For DWDM channel spacings of the order of 25 to 50 GHz, the, system provides a very compact, optically efficient and versatile approach which is adaptable to many different applications, and which are optimized to achieve high performance optical specifications.

A combination of high wavelength resolution, compactness and low loss can be attained by employing a diffraction grating in the Littrow configuration, with the grating rulings transverse to the long axis of the anamorphic beam, and a Mangin reflector system for collimating and refolding the beams, and later converging and imaging the wavelength beams onto spatially separate locations. The diffraction grating is angled at the nominal Littrow angle to reflect and disperse individual wavelength components within a sagittal plane, symmetrically distributed about an axis substantially normal to the Mangin mirror system. For 50 GHz and smaller channel spacings, the demands on optical resolution are particularly severe, and require novel high resolution optical designs. In such applications it is preferred to employ a polarization sensitive diffraction grating with high ruling density (e.g. 1100–1200 lines/mm) and a double Mangin mirror system, with four spherical surfaces, of which only the back surface is reflective. This combination is an elegant and practical approach to achieving very flat pass bands, sharp spectral roll-off and low adjacent channel cross-talk, characteristics necessary for the denser channel spacings. With this construction, an 80 to 100 channel DWDM system with 50 GHz channel spacing is realized within a volume which is nominally 15 cm long, less than 10 cm wide and 2 cm tall. 50 GHz optical devices demand a highly refined optical system. However, when channel spacings are greater, e.g. 100 GHz, more design options are feasible, and a polarization independent grating of 600 lpm and a single Mangin reflector may be suitable.

In general, more than one input beam can be launched into the optical system, sharing the reflecting and focusing surfaces while impinging the surfaces at slightly different levels. The polarization components are also separated and refolded in parallel paths to accept more than one beam.

The signal modulators or modifiers for the individual spatially dispersed wavelength components can be used in different system configurations to provide channel equalization, channel blocking, channel add/drop, band splitting and interleaving, or channel switching. A particular example of a channel equalizer/blocker in accordance with the invention uses the reciprocal path configuration for refolding the beams before and after individual control, and an array of reflective liquid crystal elements at the image plane. After phase retardation or variable rotation by the reflective liquid crystal cells, as determined by control signals applied to the cells, the polarization sensitive elements in the signal path block or divert that portion of the signal to be rejected. The wavelength signal components are variably attenuated for channel equalization purposes, or fully extinguished (>40 dB) for block purposes.

In accordance with another aspect of the invention, the polarization splitter comprises a Wollaston prism combination close to the input anamorpbic collimator device, to separate the orthogonal s and p polarization components into separate beams diverging at a small angle, such that the two beams coincide and overlap at the plane of the modulator. This overlap at the LC-SLM, for example, ensures that both polarization components experience the same amount of retardation which is necessary to give zero PDL and PDF (polarization dependent loss and polarization dependent frequency) by design. Both polarization components are also polarized parallel to one another and parallel to the grating rulings. In their return paths from the reflective liquid crystal elements, the upper beam is directed along the lower beam path and visa versa. Following recombination upon the second pass of the grating, the wavelength components are collapsed back into two orthogonally polarized beams, which are then reunified by the polarization splitter into a single beam for return to the optical fiber mode.

For fixed filtering applications, a specifically patterned template may be disposed at the image plane, to reflect or transmit individual channel signals. The system may be single sided, reflecting signals reciprocally back along the same optics to a common input/output port, or to a separate output port slightly displaced from the input. The system can also be double sided, transmitting channel signals through the template and into a second complementary diffractive Fourier optics assembly. Both optical assemblies can be used at the same time, increasing the combinations that are possible with a static system. Furthermore, two different level gratings and/or two different ports can be used in each beam refolding combination, so that either port can be used as either input or output. With such flexibility the static multichannel template can be used to provide selective channel blocking, drop and throughput patterns, 1×2 channel splitting, and interleaver operation.

In another system in accordance with the invention the wavelength signal modifier array may comprise static or dynamic elements which shift the elevation level of one or more channel input signals or block of signals, for direction to one or more different level output ports. For an interleaver, DWDM signals from one input port can be divided into odd and even channels combined at separate output ports. This takes advantage of the fact that multiple low profile beam patterns at different levels can be refolded concurrently within the same compact volume.

For high efficiency reflection, adequate response times and simplicity of operation, it is preferred to employ zero twist nematic liquid crystal cells, which function as half wave retardation elements for full extinction, and as variable retardation elements for analog control of attenuation. The dispersion of the cells in the sagittal plane may be chirped to precisely map the dispersion plane to the ITU wavelength standard. Other types of spatial light modulators, such as MEMs and twisted nematic liquid crystal cells may be used for dynamic signal control depending upon the application. High density microlithographic patterns may be used to define the multi-channel controls for static blocking, attenuation, reflection or transmission of signals in different channels.

Various tuning and alignment techniques can be used to reduce insertion loss and reduce optical aberrations. For example, the ambient pressure and/or environment within the enclosed housing may be used to achieve period and phase tuning, and the positions and angles of various optical elements are maintained within close limits to maintain beam uniformity, low PDL and low PDF.

Associated optical circuits and devices can be employed to provide other capabilities for meeting multi-channel requirements of DWDM systems, based on the use of diffractive Fourier optics modules, which may employ one or more fiberoptic ports. Combinations of fiberoptic splitters, circulators and thin film filters may be used to enable unique system combinations for achieving add/drop multiplexing, demultiplexing, and equalization.

BRIEF DESCRIPTION OF THE DRAWINGS

A better understanding of the invention may be had from the following description, taken in conjunction with the accompanying drawings, in which.

DETAILED DESCRIPTION OF THE INVENTION

Figure 1:
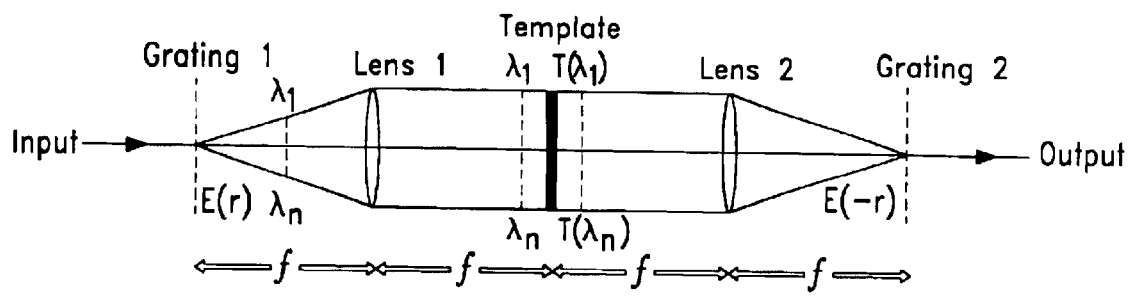
FIG. 1 is a schematic diagram of a system displaying diffractive and Fourier optics.

New systems and methods for manipulating multiwavelength optical signals to accomplish a wide range of functions are based on the combined use of diffractive and Fourier optics together with a fixed or dynamic template. By angularly dispersing the spectral components of a multiwavelength input beam with a diffraction grating and performing a Fourier transformation with a suitable low optical aberration lens/mirror system, a spatially separated, linear spectrum of the input wavelength channels is generated at an image plane. Selectively controlling the wavelength dispersed components with a template, and then recombining the distributed field components through the inverse Fourier relationship and diffractive optics (e.g., retracing the incident optical path in reverse following reflection) can generate arbitrary and precise, static or dynamic wavelength filtering functions in a low optical loss fashion.

Optical Design and Background

The optical system described herein utilizes a fiber coupled, diffraction grating based, double pass spectrometer which has been designed to achieve high passband flatness and low chromatic dispersion. These advantages become apparent by considering FIG. 1, which illustrates the basic principle of diffractive Fourier optics. An input beam is spectrally dispersed in angle into input field $\Sigma_j E_j(r)\exp(-ik_j z)$ by diffraction grating 1, which lies a distance f from lens 1 in the object plane. The focal lengths of lenses 1 and 2 are also f. A template is located a distance f to the right of lens 1, in the image plane. This nominally 4-f optical system yields a field distribution $\Im[E_j(r)]$ just before the template, which is the Fourier transform of the input field. Rather than an angularly dispersed optical spectrum, which is what an ordinary diffraction grating produces, the Fourier transformed field just before the template is a spatially linear optical spectrum. Note that in practice, the location of the image and object planes can deviate from these ideal conditions, which provides additional design flexibility, by suitable design of the focusing element.

For simplicity, assume that the transfer function of the template $T(\lambda)$ can only take on the values of 0 or 1, determining whether the wavelength channels are to be transmitted or blocked. This restriction is not necessary in general, since any complex valued transfer function is also valid and is part of this invention. Clearly, for those wavelengths where T=0, no light is permitted beyond the template and no output signal is obtained.

Conversely, for those wavelengths where T=1, the field transmitted by the template remains $\Im[E_j(r)]$. Being a distance f from the template, lens 2 performs the optical Fourier transform of this field, yielding $$\Im\{\Im[E_j(r)]\}=E_j(-r)$$

just before grating 2, which is located a distance f to the right of lens 2. Because of the minus sign in the above equation, grating 2 will recombine, rather than further disperse, the incident field $\Sigma_j E_j(r)\exp(-ik_j z)$ into a single output beam identical to the original input beam.

Therefore, by choosing the appropriate phase or amplitude template, any combination of output channels can be configured or modified in time delay and/or optical power. A spatially varying transmission pattern is directly mapped to a wavelength varying transmission pattern by the optical system. The template may be tunable or variable to permit dynamic reconfiguration of the device. Because the input field is faithfully reproduced at the output wherever T=1, the output channels will suffer no phase or amplitude distortions such as chromatic dispersion or insertion loss ripple, unlike that with ordinary DWDM technology. Moreover, the wavelength channels that are not transmitted wherever T=0 can be directed through the device to other output ports by using a reflective or prismatic template. This expedient enables any input wavelength channel to be switched or routed to any output fiber. A MEMS mirror or liquid crystal array could be used to permit dynamic wavelength routing, switching or attenuation.

In a particular implementation in accordance with the invention, a compact low profile multiwavelength system with multiple ports is configured with reflection gratings, anamorphic beams and reflective optics, which disperse wavelength components through close parallel planes angled to fold into reciprocal paths within the unit. The optical design utilizes Fourier optics principles to image the wavelength dispersed input fiber mode anamorphically onto a liquid crystal spatial light modulator (LC-SLM). The diverging beam waist of the input expands and is collimated by the first focusing element of focal length $f_1$, to achieve full illumination of the grating rulings, and the second focusing element of focal length $f_2$ transforms the angular dispersion at the grating into a continuum of beam waists spatially separated according to wavelength. The focal lengths $f_1$ and $f_2$ can be different, in which case a magnification factor from the object to the image planes is introduced.

Fourier Transforming/Imaging Optics

The use of Mangin mirror assemblies provides advantages in high resolution spectrometers which demand focusing optics of diffraction limited optical resolution. First, a single element Mangin mirror reduces optical aberrations and insertion loss, while maintaining high optical resolution within a compact package for 100 GHz filtering applications. Second, a dual element Mangin mirror with these same advantages is optimal for channel spacings of 50 GHz and below.

In the prior art, spherical mirrors have served as focusing lenses. Spherical mirrors produce aberrations which lead to crosstalk degradation. Parabolic mirrors eliminate aberrations for on-axis rays, but off-axis rays still experience significant aberrations. These aberrations become problematic in compact implementations of high resolution 50 GHz filtering applications. Spherical abberation, for example, causes rays entering near the edges of the optic to focus at different longitudinal distances from the focusing optic. Coma causes rays entering near the edges of the optic to focus at different transverse distances along the focal plane. Both these effects produce a loss of optical resolution and, as a result, degrade the adjacent channel isolation and passband flatness. To mitigate these effects, a Mangin type reflector with refractive front surface and a reflective back surface, each surface spherical with a different radius of curvature, is incorporated.

Shared Input Collimator

A shared single collimator for both input and output beams reduces the complexity and stability requirements of the fiber coupled spectrometer. Only a single collimator must be precisely aligned and welded into the optical system. The return beam tracks the input beam, so that slight collimator misalignments do not compromise optical performance. The output beam can than be extracted from the input fiber by using mature circulator technologies.

Generalized 4-f Configuration

The 4-f configuration places/practical limitations on the size of the device, which can be overcome by incorporating an alternate "imaging" type configuration. An advantage of the imaging type configuration is the ability to use a tight vertical fold angle.

In the preferred implementation, a single reflective lens assembly which is double passed serves as both focusing or Fourier transforming optics. In a first approach, the well-known but restrictive 4-f configuration can be adopted. In this configuration, both the object plane (i.e., the input optical fiber) and the image plane (i.e., the location of the modulator array) are located at the focal planes of the shared lens. This requirement does not need to be met, however, in compact, high resolution optical system. In fact, in the most compact designs, it is often advantageous to move away from the 4-f configuration. The modulator array and input beam waist are not placed at the focal planes, but rather at the image/object planes, respectively. In fact, the key design factor to maintain high optical resolution, wide flat pass bands, and low chromatic dispersion is that the Gaussian beam waists lie precisely at the LC-SLM plane. Maintaining this "imaging" condition is more important than maintaining precise f spacing between each optic. For example, the requirements on the positions of the input collimator and LC-SLM relative to the focusing element(s) are much looser than the tolerances on the position of the LC-SLM relative to the beam waist locations. The beam waist location depends of several interrelated factors, including the input collimator location and the focusing element locations.

Therefore, the optical design described herein is not limited by the 4-f condition. The only condition which must be satisfied is that the input beam waist is mapped to an output beam waist coinciding with the modulator array or fixed template. That is, the distances between optical elements must be selected such that the anamorphic beam waist produced at the input collimator is re-imaged at the plane of the modulator array. This ensures that the advantages of wide, flat passbands and zero chromatic dispersion are achieved. Specifically, if the collimator object plane is greater than a distance f from the focusing optic, then the image plane is less than the distance f from the focusing optic. In practice, this flexibility reduces mechanical interference issues between the input lens assembly and the diffraction grating, translating into a tighter fold and a low profile package. It is desirable to place the input anamorphic beam waist behind the plane of the diffraction grating to avoid mechanical interference issues which would lead to increased fold angle, potential off-axis beam aberrations, and package height. In this invention the more general imaging type (non-4-f) spectrometer configuration is also described.

Anamorphic Beams

The use of anamorphic beams within the fiber coupled spectrometer provides several advantages. First, the reduced optical intensity at the modulator plane improves power handling. Second, anamorphic optics enable tight vertical folding of the optical beams and reduce the package height. Third, they enable less expensive, simpler and smaller optics to be used within the device.

Anamorphic beam shaping optics reduce the height of the device without compromising optical performance and also increase the power handling rating by enlarging the optical beam at the modulator array. The collimator assembly utilizes anamorphic optics to shape the beam in the transverse and sagital dimensions before launching the free space beam into the folded optical system. Along the diffraction direction, it is necessary to adequately fill the grating to achieve the necessary resolution. That is, the resolution is related to the total number of rulings illuminated on the grating. Therefore, the optics expand the beam from the fiber to the diffraction grating plane. However, in the direction perpendicular to the plane of diffraction, it is desirable to maintain a relatively small spot to minimize the package height. Note that the fill factor of the optical beam on the diffraction grating normal to the grating vector does not impact optical resolution. In addition, the spot size at the LC-SLM, perpendicular to the array direction, should be sufficiently large to maintain average power levels below the power threshold for degradation in optical response. It is advantageous that the spot size parallel to the array direction for any particular wavelength should be minimized such that the spot is several times narrower that the required pixel width for 50 GHz spacing. The typical spot size at the LC-SLM array is 8 to 10 um horizontal by 100 to 250 um vertical. Note, however, that the sense of beam asymmetry at the grating is inverted by the focusing element. The spot size in the vertical direction at the grating and the Mangin mirror is relatively small (~1 mm) compared to the spot size in the horizontal direction (~25 mm). This allows tight folding in the vertical direction, while maintaining near horizontal incidence angle on the grating and the Mangin. The beam is normally incident to the LC-SLM reflective plane.

Three Dimensional Fold

The three dimensional fold is a superior approach to the common two dimensional fold used in grating spectrometers, providing numerous performance advantages. First, the three dimensional fold reduces optical aberrations, achieves high wavelength resolution, and reduces insertion loss is a most compact package. Second, the three dimensional fold reduces the number of optical elements by enabling multiple passes through shared optics.

The use of anamorphic beams of reduced dimension normal to the dispersion plane allows the optical system to be tightly folded in this transverse dimension. The dispersion of a diffraction grating is limited to one dimension and oriented in a sagital plane. Anamorphic beam converters can then be used to reduce the height of the internal optical components and the overall package size of a diffractive Fourier optics device. Since the resolving power of a grating is given by $R=\lambda/\Delta\lambda=W(\sin \alpha+\sin \beta)\lambda$, where W is the ruling pitch of the grating, $\lambda$ is the wavelength of light, and $\alpha$ and $\beta$ are the incident and diffracted angles, respectively, a reflection grating in (near) Littrow configuration is preferred. Mirrors rather than lenses are also preferred to reduce the overall length of the device by folding. For a grating of width W, the package size can be further reduced by using high numerical aperture optics of short focal lengths. An on-axis beam path minimizes optical aberrations in the fast optics. Fiber coupling may be accomplished through holes drilled in the center of the diffraction gratings, which enables the on-axis beam paths and keeps size to a minimum. It also permits the use of common collimating and focusing optics to further reduce package size and minimize component count.

The beam paths are folded to substantially shorten the length of the package. Minimization of the fold angles is desirable to reduce aberration effects which compromise resolution. This becomes increasingly important for channel spacings below 50 GHz. The 2D folded design places fundamental geometrical constraints on the design which prevent these angles from being minimized. The 3D folded design described herein takes advantage of the third dimension, in which the beam is collimated and relatively small, to dramatically reduce the angles of incidence. The beams at the Mangin mirror are two cigar shaped spots slightly displaced from one another in the vertical direction (y). The beams at the diffraction grating are elongated in the dispersion direction (x) and overlap at a single location. In the 2D fold design, the fold direction (x) is parallel to the dispersion direction (x). In the unique 3D fold design described herein, the fold direction (y) is orthogonal to the dispersion direction (x), represented schematically in FIG. 2.

Additional input and output ports to the ones shown in FIG. 1 can be provided by spatially multiplexing additional diffraction gratings and optical fibers in planes above and below the plane of FIG. 1. The anamorphic profile of the optical beams permits independent beam paths to be stacked or multiplexed in the vertical dimension of the device. These new ports can be accessed, for example, by redirecting the incident light on the template by reflection to the desired input or output fibers.

Both polarization independent and polarization dependent diffraction gratings are commercially available. Each type has its own advantages and disadvantages in optical system applications. 600 lines/mm gratings are available in low PDL versions, and 1100 1200 lines/mm gratings are generally polarization dependent when operated in the 1550 nm range. Polarization independent gratings simplify the polarization management optics, but have limited angular dispersion because of the upper limit on the ruling density.

Wollaston Prism

The use of a Wollaston prism as the input to a grating spectrometer provides an improved method of polarization management. First, the Woliaston beam splitter provides overlapping beams at the LC-SLM plane, which eliminates the dependence of PDL on the level of variable attenuation due to LC nonuniformities. Second, the Wollaston transforms the beams such that their polarizations are suitably aligned to the grating ruling direction.

A Wollaston prism separates an unpolarized beam into two linear and orthogonally polarized beams angularly displaced relative to one another. Once the beams propagate a distance such that they are adequately separated, their polarizations can be rotated to be parallel to one another. The Wollaston ensures that the two polarization components precisely overlap in a single spot at the modulator plane. If an LC-SLM is coincident with the modulator plane, then both polarization components will experience identical amounts of retardation. This overlap eliminates any mechanisms for PDL, which can become problematic at high attenuation states (e.g., 10 to 20 dB). The Wollaston creates a ring-like optical path, in which one polarization propagates clockwise through the ring, and the orthogonal polarization propagates counterclockwise through the ring. The benefit of such approach is that both polarizations experience identical propagation effects even though they are spatially separated outside of the image and object planes.

Liquid Crystal Spatial Light Modulators

Dynamic optical filtering devices require active elements to achieve a programmable optical response, such as MEMs or liquid crystal modulators. To achieve a combination of high blocking efficiency and precisely controlled variable attenuation within the same modulator, it is advantageous to utilize zero twist nematic LC-SLM's. A first advantage of zero twist nematic LC-SLM's is that they provided improved stability and attenuation resolution in the variable attenuation mode. A second advantage is that they provide in excess of 40 dB extinction. A third advantage is that LC-SLM's have no moving parts, in contrast to MEMs type devices, which consequently raise reliability concerns.

Optical Design With a Polarization Independent Grating (600 lpm)

An optical system is first described for device applications utilizing a low PDL grating (typically <0.5 dB PDL). For fiberoptic applications, this level of PDL is still unacceptably high, so additional compensating means must be introduced into the design. Two passes of the grating(s) are necessary, and the residual PDL during a first grating pass can be compensated for by the PDL during a second grating pass. Optical waveplates are used to rotate the state of polarization of the first-diffracted beams by 90 degrees before they reach the grating upon return. This can be accomplished with two ¼-wave plates positioned about the template. The residual PDL of the two gratings now cancel, reducing the net PDL of the device.

Fiberoptic components typically require polarization management optics to ensure polarization independent operation. For polarization dependent elements such as gratings and liquid crystal type modulators, the input states of polarization must be fixed and well defined. Typically, the input beam is split into its two orthogonal and linear polarization components before reaching these elements. To minimize PDL, it is desirable for both polarization components to travel over substantially identical beam paths. In the prior art, the input beam is typically separated into orthogonal polarization components at the input/output collimators, these components propagating in parallel through the entire optical system. It is desirable to minimize this beam separation, as imperfections in coatings and optical surfaces would cause differential loss between two spatially separate beams, which can create an elevated level of PDL. Therefore, in a first example the two polarization components overlap throughout the optical system until they reach the LC-SLM subassembly, wherein they are spatially separated by greater than 100 um for processing by the liquid crystal, and immediately combined back into a single beam for completion of the return path to the collimator.

The linear state of polarization azimuth angle relative to the LC-SLM optical axis is $\alpha_1$=45.0+/−0.1 degrees. This tolerance ensures 45 dB extinction in the blocking condition. To ensure high extinction for the upper and lower beams, the linear (p) state of polarization azimuth angle relative to (s) state of polarization is $\alpha_2$=$\alpha_1$+90.0 degrees. To maintain less than 0.5 GHz polarization dependent frequency (PDF), the angle of the line bisecting the two optical beams relative to vertical axis is $\alpha_3$=90.0+/−0.2 degrees. This further requires that the optical axis angle relative to horizontal axis, defined as the short axis of the pixel, is $\alpha_4$=0.0+/−0.2 degrees. This angular misalignment budget includes errors resulting from alignment irregularities when rubbing and aligning the patterned LC backplate, the ITO front plate, and the birefringent compensating plate.

One of the most important optical performance characteristics of a channel blocker is the channel extinction; that is, how well a channel is blocked. In addition to the liquid crystal, the PBD subassembly is the determining factor in achieving this specification. The PBD subassembly utilizes two PBD's of different optical axis orientations. To ensure that the displaced beams exit from the subassembly with the correct spatial orientation and state of polarization (necessary to achieve high extinction and low PDF), precise control of the optical thickness is necessary. The optical thickness depends on the index of refraction and physical thickness. Typically, it is adequate to ensure that the physical thicknesses are precisely matched (to within 1 um). In addition, it is advantageous to utilize crystalline materials which exhibit relatively low dependence of optical characteristics on temperature.

The LC-SLM pixel widths map directly to channel spacing. To ensure a precise 50 GHz channel plan, the LC-SLM subassembly may be rotated slightly relative to the optical beam propagation direction to change the channel spacing. For example, a 25 MHz channel spacing change corresponds to 0.0286 degree rotation. By rotating the entire LC-SLM-PBD2-PBD1 assembly for period tuning, no compromise in the PDF or channel extinction performance results.

The next step is measure PDL and insert an appropriate PDL compensation waveplate. This waveplate has a single pass retardation between 0 and $\pi/2$ radians. The PBD assembly introduces some amount of retardation because PBD 1 and PBD 2 are not exactly matched in optical path length. The added waveplate ensures that the total round trip retardation of the pbd and waveplate assembly, across all wavelengths, is $\pi$ radians. This ensures that the polarization of the beam is rotated by 90 degrees between the first pass and the second pass. Once PDL trimming is accomplished, the waveplate is tilted along the LC-SLM pixel array direction to translate the beams as needed along the LC-SLM. This allows the center frequency of the channel equalizer to be precisely aligned to the ITU grid. For a quarter waveplate of 45 um nominal thickness, a +/−10 degree rotation corresponds to a physical shift at the plane of the LC of +/−5 um, which corresponds to an absolute frequency shift of +/−10 GHz. The thicker the waveplate, the greater the amount of frequency tuning for a given angular change.

To achieve the maximum wavelength resolution in a compact package, the Littrow configuration is the preferred approach. The resolving power in the Littrow configuration ($\alpha=\beta$) is R=Nd/$\lambda$(sin $\alpha$+sin $\beta$)=2 Nd sin $\alpha$/$\lambda$. The Littrow angle determined by m$\lambda$=2 d sin $\alpha$ in first order is 27.7 degrees. In the Littrow configuration the light at the target wavelength (1547 nm, for example) is diffracted back along the incident beam direction. Littrow operation also ensures that the maximum resolution for a given grating pitch is achieved. At the same time, smaller incidence angles are used, allowing smaller diffraction gratings and a more compact mechanical design.

Figure 2:
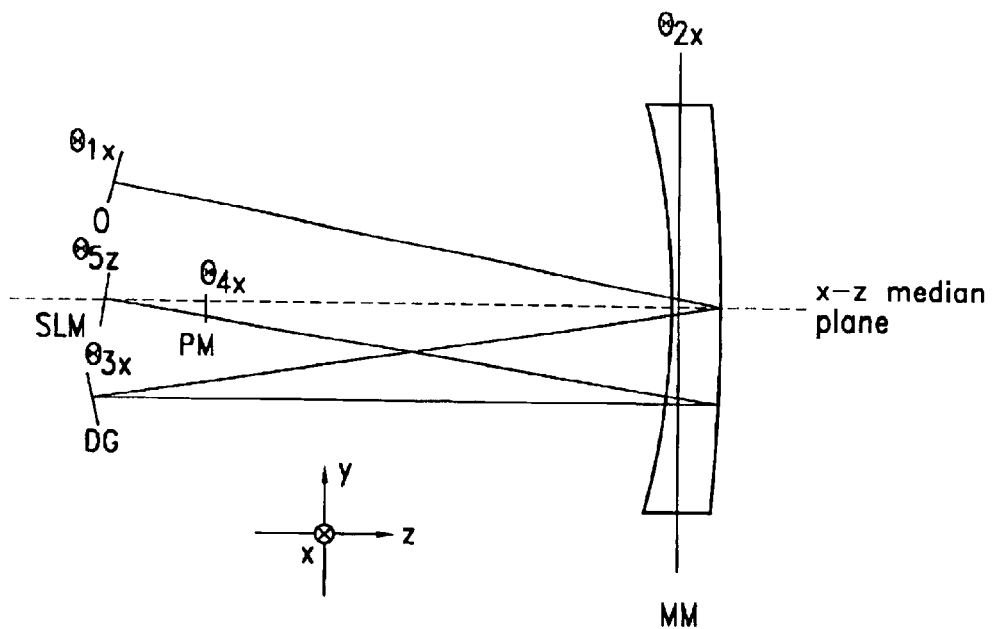
FIG. 2 is a schematic diagram of beam paths between a diffractive grating and mirror, showing typical beam angles.

FIG. 2 illustrates the relative orientation of the optical beams relative to the median plane. Angle $\theta_{1x}$ is the declination angle of the input beam (O), angle $\theta_{2x}$ is the angle of the focusing reflector (MM), $\theta_{3x}$ is the angle of the diffraction grating (DG), $\theta_{4x}$ is the angle of the pickoff mirror (PM), and $\theta_{5z}$ is the angle of the amplitude modulator/blocker (SLM). Note that the SLM is actually out of the plane of FIG. 2 because the pickoff mirror is at $\theta_4 y$=45 degrees. For a typical configuration, $\theta_{1x}=\theta_5 z$=2 $\theta_3 x$=2.5 degrees, and $\theta_{2x}=\theta_4 x$=0 degrees. However, to ensure that the mapping of spot location to wavelength at the SLM lies in the median plane, $\theta_{3x}$ is equal to 1.1 degrees, and $\theta_{3y}$ (the tilt of the grating lines) is equal to 0.6 degrees. Note again that diffraction occurs in the x-z plane, which is orthogonal to the fold direction. As a result, the angles $\theta_{1x}$ and $\theta_{3x}$ can be minimized, which improves the optical performance characteristics of the system. The grating is oriented such that it reflects all wavelengths into the median plane. The wavelengths are dispersed such that the center of the operating band, 1547 m for the C band, reflects back in the Littrow geometry. For a grating with 600 lines/mm the grating is rotated at $\theta_3 y$=27.65 degrees.

Optical Layout for Polarization Dependent Grating (1100, 1200 lpm)

Figure 3:
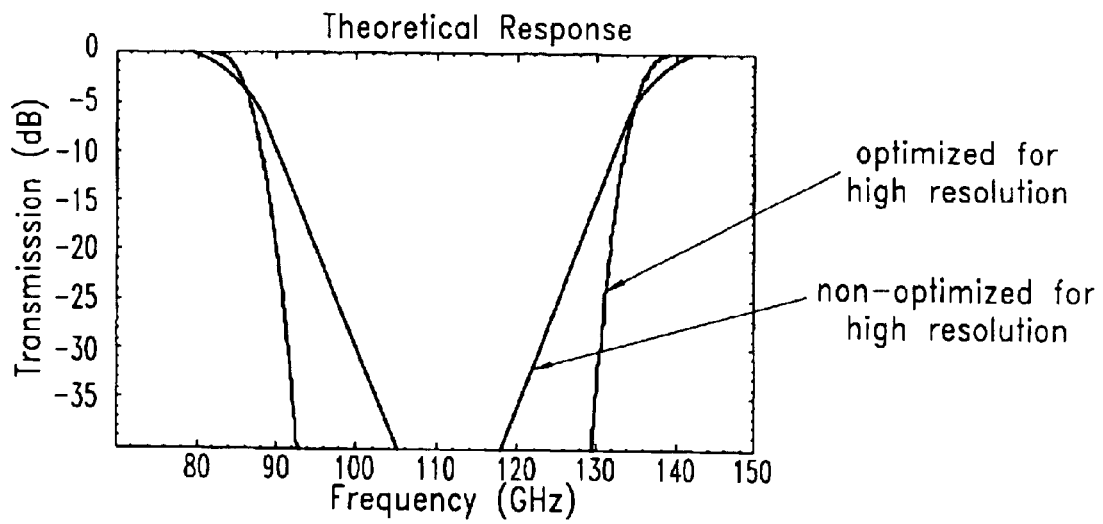
FIG. 3 is a graph of transmission versus frequency showing stopband characteristics.

To achieve the maximum wavelength resolution in a compact package, a grating with a finer ruling is preferred. However, this is typically at the expense of polarization independence of the grating. The Littrow angle in first order (1100 lines/mm) is 58.2 degrees. The reflective diffraction gratings are generally of the replicated type, and can be holographic or ruled, sinusoidal or blazed. In the Littrow configuration the light at the target wavelength (1547 nm, for example) is diffracted back along the incident beam direction. The theoretical frequency resolution of a diffraction grating based optical filter is determined by the number of illuminated rulings. For a 50 GHz optical filter, it is advantageous to utilize a ruled diffraction grating with 1100 lines/mm, and >90% efficiency for s polarized light across the c-band. The resolution is further determined by the relative size of the wavelength impulse response at the LC-SLM plane and the pixel format of the LC-SLM. For example, a device with pixels chirped in width from 70 to 95 um, 2.5 um interpixel gaps, and 43 dB maximum extinction is described herein. Fringing fields effectively increase the interpixel gaps to an effective width equal to the liquid crystal cell gap. For the reflective half wave retarder, the liquid crystal cell gap is approximately 4 to 5 um wide. The optical beam at LC-SLM plane is transformed to have an 8 um diameter in the horizontal direction and 200 to 250 um in the vertical direction. The theoretical stopband over which 40 dB extinction is maintained is equal to 37 GHz, corresponding to the more rapid roll-off illustrated in FIG. 3. The more gradual roll-off illustrated in FIG. 3 corresponds to the case of un-optimized optics which do not meet the performance requirements of 50 GHz systems.

Figure 4:
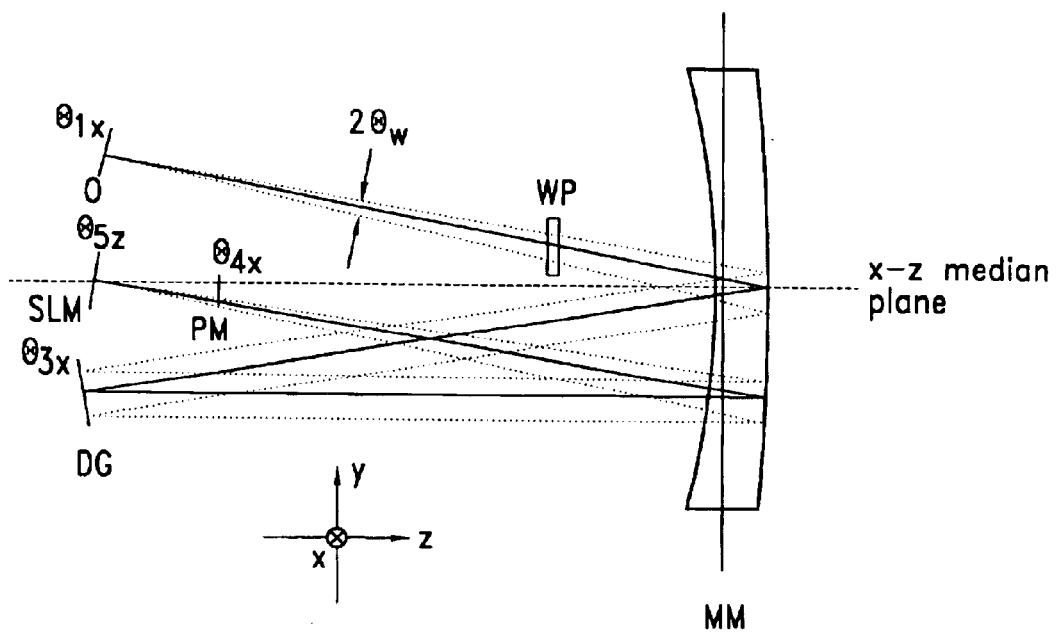
FIG. 4 is another schematic diagram of beam paths between a diffraction grating and concave mirror when polarization components are split and propagated separately.

The Wollaston beamsplitter is located at the input plane after the anamorphic beam shaping optics, and separates the input beam into two beams separated by an angle 2 $\theta_w$, as illustrated in FIG. 4. Angle $\theta_{1x}$ is the declination angle of the input beam (O), angle $\theta_{2x}$ is the angle of the focusing reflector (MM), $\theta_{3x}$ is the angle of the diffraction grating (DG), $\theta_{4x}$ is the angle of the pickoff mirror (PM), and $\theta_{5x}$ is the angle of the amplitude modulator/ blocker (SLM). Note that the SLM is actually out of the plane because the pickoff mirror is at $\theta_4 y=45$ degrees. For a typical configuration, $\theta_{1x}=\theta_5 z=2$ $\theta_3 x=2.5$ degrees, and $\theta_{2x}=\theta_4 x=0$ degrees. However, to ensure that the mapping of spot location to wavelength at the SLM lies in the median plane, $\theta_{3x}$ is equal to 2.37 degrees, and $\theta_{3y}$ (the tilt of the grating lines) is equal to 2.0 degrees. Note again that diffraction occurs in the x-z plane, which is orthogonal to the fold direction. As a result, the angles $\theta_{1x}$ and $\theta_{3x}$ can be minimized, which improves the optical performance characteristics of the system. The grating is oriented such that it reflects all wavelengths into the median plane. The preferred grating has 1100 rulings per mm. The wavelengths are dispersed such that the center of the operating band, 1547 nm for the C band, reflects back in the Littrow geometry at 58.2 degrees.

It is necessary to transform both beams into the s state of polarization, because the diffraction grating exhibits high efficiency (>90%) only for s polarization. WP is a waveplate array, and consists of two half waveplates, the top oriented at 45 degrees relative to the p polarized beam, to transform it into an s polarized beam, and the bottom oriented at 0 degrees relative to the s polarized beam, to maintain it as an s polarized beam and precisely equalize the two path lengths. Equalization of path lengths is necessary to image both beam waists at precisely the same location in the LC-SLM image plane. This ensures that the waists of the optical beams lie in the Fourier plane to provide optimal resolution characteristics. This optical system also achieves both low excess loss and low polarization dependent loss.

Liquid Crystal Spatial Light Modulator

Dynamic functionality is provided by the introduction of an electronically addressable, pixelated spatial light modulator into the wavelength dispersed image plane of the input optical fiber. In one embodiment, a reflective type LC-SLM transforms incident beams of linear polarization into reflected beams of transformed polarization in a wavelength channel independent fashion. The use of proven LC technology is attractive because of the widely available LC-SLM manufacturing services and the extensive long term reliability data available for this technology. These cells serve as variable attenuator arrays, for example. The ellipticity and azimuth angle of the transformed beams are determined by those control voltages applied directly to the liquid crystal pixels. Polarization management optics are designed to transform this polarization modulation into amplitude modulation for an arbitrary input state of polarization.

In a specific example, the liquid crystal pixel elements are tall normal to the grating dispersion direction (transverse plane) and narrow parallel to the dispersion direction (sagital plane), and the impinging wavelength dispersed beams are spatially separated and distributed in a linear fashion within the sagital plane. The individual polarization orientations of the dispersed beams are voltage controllable upon propagating through the active pixel elements. Each cell operates on only a single wavelength channel, and by utilizing the design features of this invention, achieve an extinction ratio in excess of 40 dB. The cell widths are defined lithographically such that they precisely map to a 50 GHz wide spectral splice. The widths of the cells in the array may be chirped to achieve accuracy in the center frequency of each passband relative to the ITU grid. The voltages may advantageously be varied across each pixel to provide uniformly high extinction or an arbitrary grey scale attenuation across the operating wavelength range.

A high extinction polarizer placed directly in front of the LC-SLM transforms the variable state of polarization rotation of the LC-SLM into variable attenuation. The optical axis of the LC-SLM is oriented at 45 degrees to the pixel array direction. The polarizer is therefore oriented at 0 degrees to provide maximum contrast. The LC-SLM produces nominally zero polarization rotation under zero applied voltage; this is the transmissive state. At some larger voltage, the LC-SLM produces 90 degrees of polarization rotation; this is the high rejection state. Intermediate voltage values provide intermediate attenuation values.

Example: Channel Equalizer

In light of these features, static and dynamic optical switching and filtering components based on modulator arrays and spectrometers offer superior performance for applications to problems in wavelength management, such as channel equalization, gain equalization, interleaving, band splitting and reconfigurable add/drop multiplexing. In accordance with the present invention, the combinations of Fourier optic principles and diffraction gratings are simplified and reduced in size to provide components of exceptional compactness, stability, and optical performance.

In one implementation, a reflective design shares a single input/output port, and a circulator is used to extract the reflected output signal present at the input port. An input/ output terminal receives the input WDM signal and directs an anamorphic, low profile beam toward a concave reflector of the Mangin type. The focused and reflected anamorphic beam is angled slightly downward to a diffraction grating in a Littrow configuration, in a direction normal to the wavelength dispersion direction and at a declination angle which has been minimized by anamorphically shaping the beams. Upon Littrow-type reflection from the grating, the beam is refolded towards the Mangin mirror. The mirror reflects and redirects the converging beam, toward an angled pick-off mirror at the level of a modulator array subassembly (an LC-SLM in the case of active control, a static reflective mask in the case of a static device), wherein the individual wavelength components of the diffracted beam impinge and are spatially localized on the elements of the modulator array. In the case of an LC-SLM, each cell introduces precise polarization control to affect optical attenuation on a cell-by-cell basis, such that the beams are reflected back through the mirrors and diffractive optics, restoring the processed WDM beam at the input/output terminal with some programmable transmission spectra characteristic.

Referring now to FIGS. 5–11, a dynamic gain equalizer 10 in accordance with the invention is designed to equalize the power of the individual channels in a DWDM communication system while meeting the demanding requirements of 25 and 50 GHz channel spacings with high optical efficiency. The optical system is fully contained within a hermetic housing 12, in which the pressure and/or gas composition may be adjusted for period tuning, as described below. Input signals on an optical waveguide (not shown) carrying the DWDM signals are provided via an optical circulator 14 to a collimator and anamorphic converter device 16 which incorporates lens elements (see FIG. 5), for first collimating the input beam and then shaping it into an anamorphic beam pair. The anamorphic pattern here has a major axis and a minor axis, the major:minor ratio being in excess of about 20:1, and the beam height (transverse direction) at its most filly divergent position being of the order of 1 mm, and the beam width (sagital plane) at its most fully divergent position being of the order of 25 mm. The beam is adjacently directed through a beam polarization splitter 18, to be described in more detail hereafter relative to FIGS. 9 (and 12), which separates the input beam, which has an arbitrary state of polarization, into its s and p polarization components. These components emanate from the beam polarization splitter 18 as separate beams diverging at a small angle (here about +/−0.6° each) and thereafter propagate separately until converging at slightly different angles onto the modulator positioned at the image plane. Elements 19a and 19b in the polarization beamsplitter 18 rotate the direction of polarization of the p components into parallelism with the s components, and equalize the optical path lengths traveled by the separated components.

Figure 5:
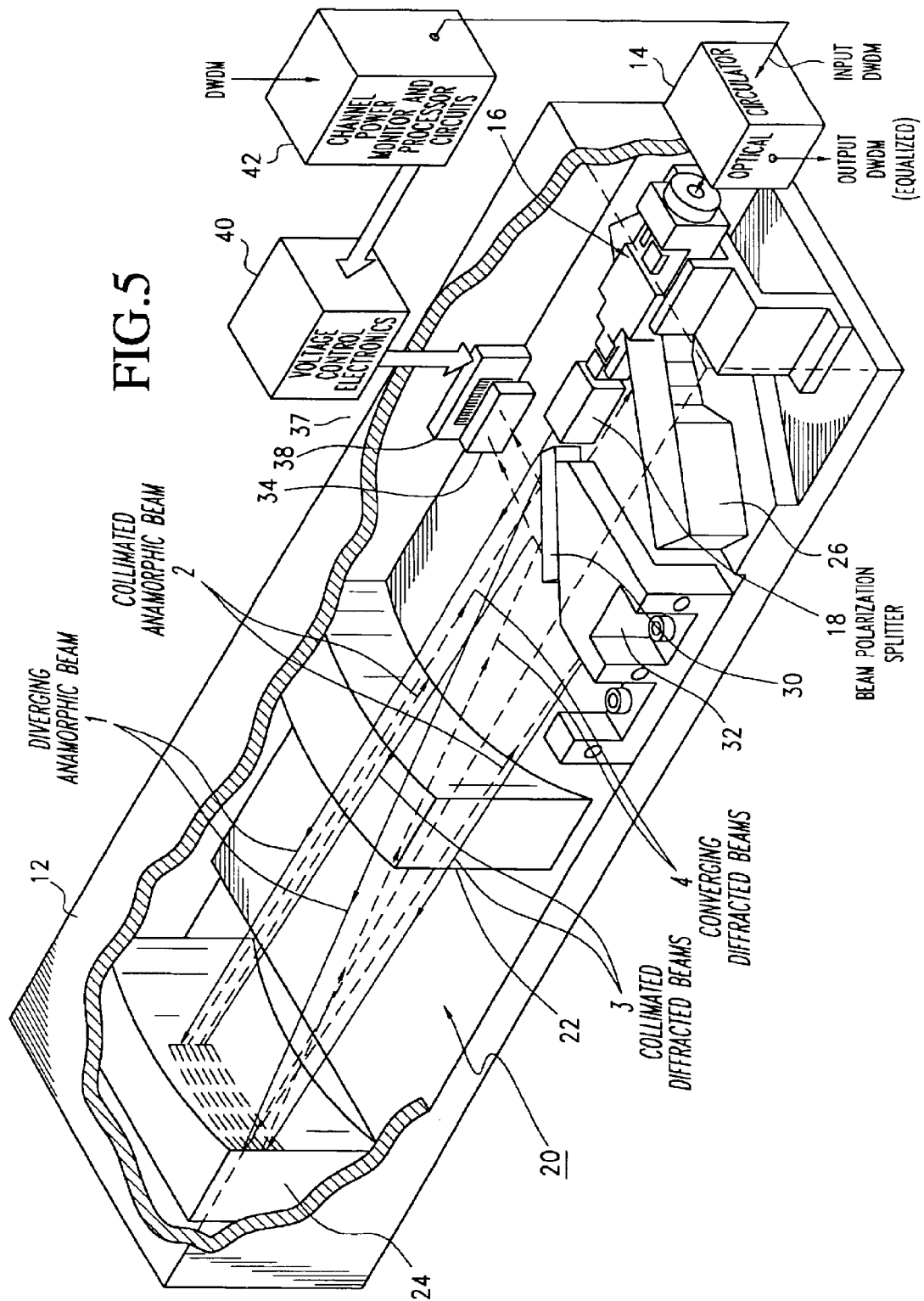
FIG. 5 is a simplified perspective view of a diffractive Fourier optics system in accordance with the invention for DWDM optical beams, configured to function as a gain equalizer, and including reciprocal incident and return optical paths and an array of reflective liquid crystal cells for controlled the diffracted beams.
Figure 6:
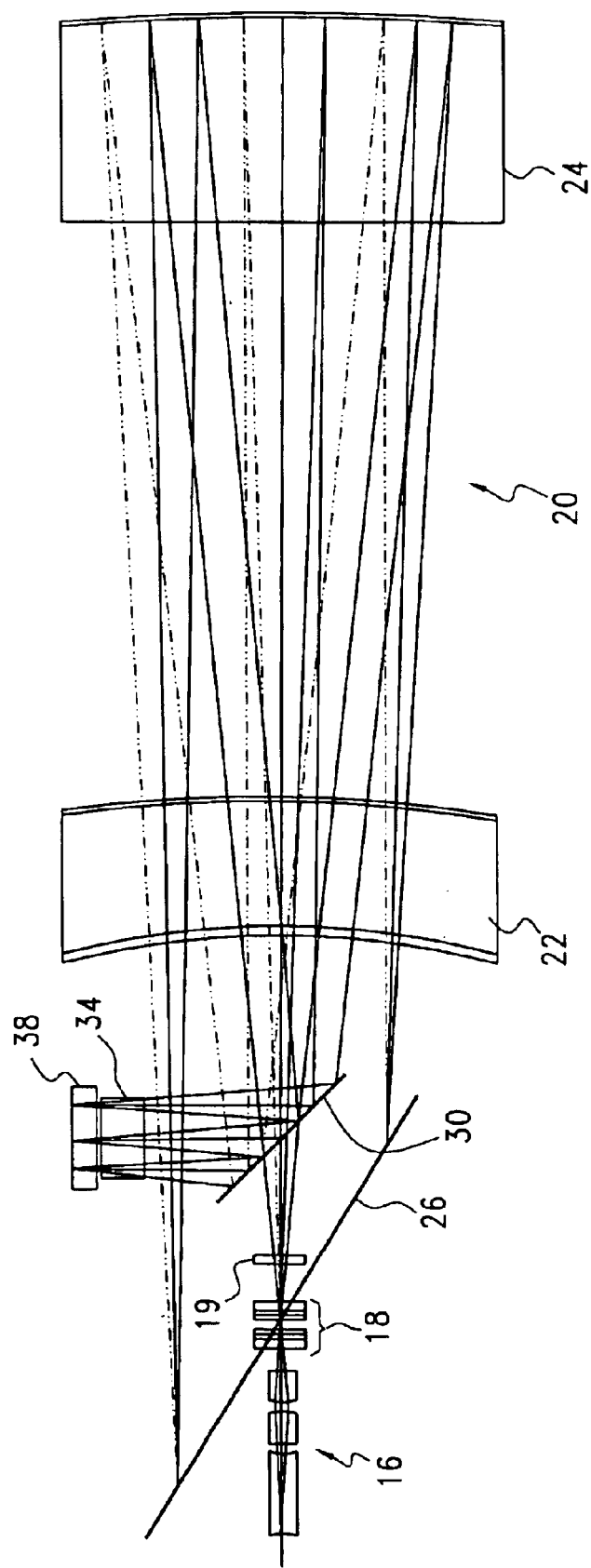
FIG. 6 is a simplified plan view of some principal optical elements in the system of FIG. 5, showing the refolding paths of incident beams directed to liquid crystal cells at the object plane and illustrating the sagittal dispersion variations.
Figure 7:
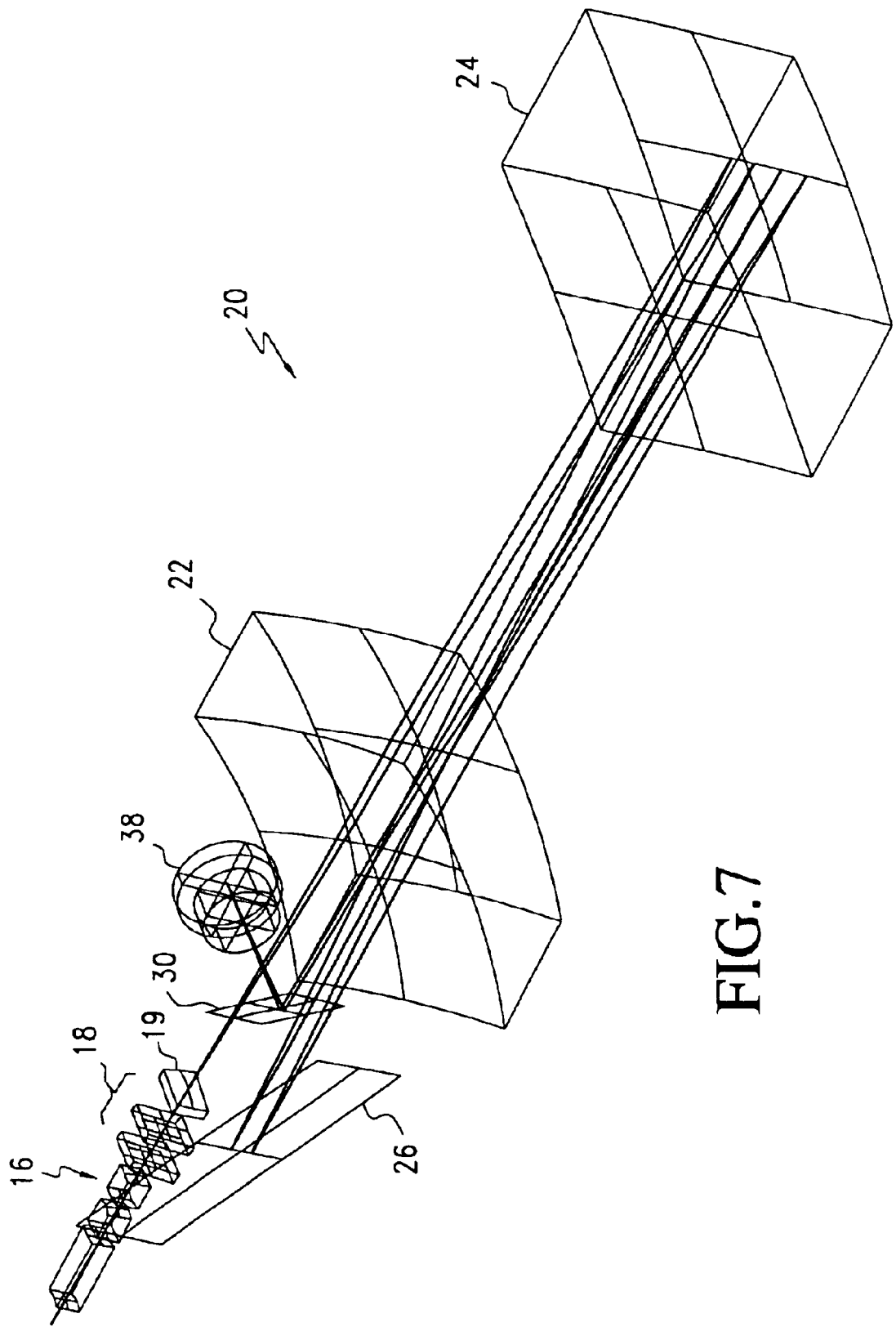
FIG. 7 is a simplified perspective view of the principal optical elements in the system of FIGS. 5 and 6, showing the separation of polarization components in elevation in the beam.
Figure 8:
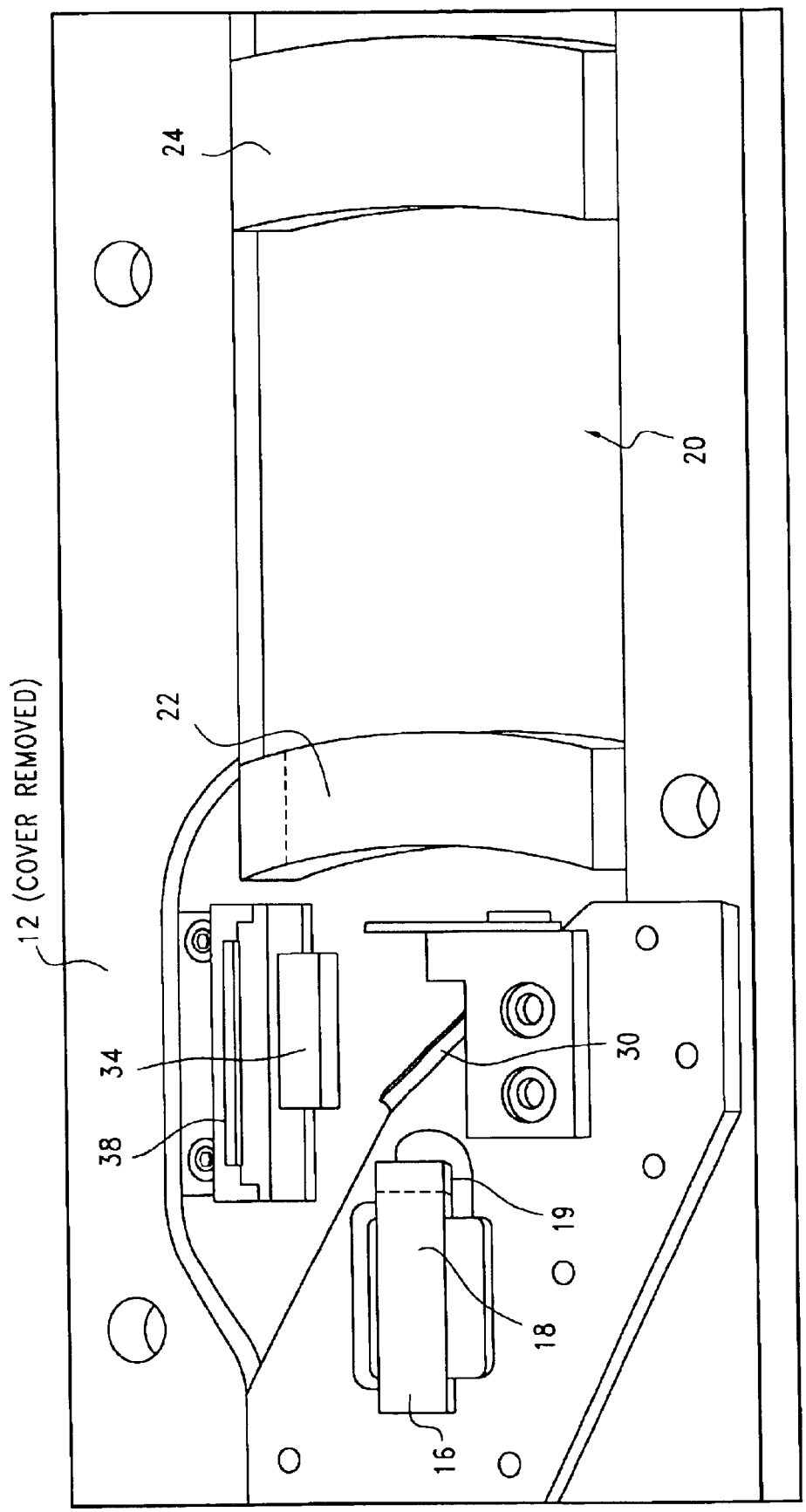
FIG. 8 is a perspective view, without beam paths, of the configuration of a practical example of a system corresponding to FIGS. 5–7, with the cover removed from the housing of the system.

From the image plane at the output of the collimator/anamorphic lens device 16, the sagittally diverging patterns of the separated polarization beams (only one of which is shown in FIG. 5) are incident on the first element of a Mangin mirror system 20. A concave reflector alone does not provide the beam shaping and corrective beam shaping that is needed for 50 and 100 GHz channel spacings. Thus the Mangin mirror system, which provides refractive power from two refractive surfaces and a selectable index of refraction, is preferred. The requirements of systems with less than 50 GHz spacing are more demanding, however. Thus in this example the Mangin mirror system 20 includes a first transmissive lens 22 of selected front and back spherical curvatures, and a second transmissive lens 24 also having spherical front and back curvatures, and having a high reflection coating on its back spherical surface. The multiple corrections introduced by these spherical surfaces in relation to the refractive indices of the lenses provide precise angular adjustments in both the sagittal and transverse directions while also controlling beam tilt, beam convergence and beam divergence at successive beam reflections.

In FIG. 5, which illustrates forward directed beam folds by solid lines and reverse folds by dotted lines, only the outer margins of the beams are indicated, since the closely adjacent polarization components cannot clearly be depicted at this scale. However, the outlines of the four reflected patterns on the back surface of the second lens 24 are shown in dotted lines.

The divergent anamorphic input beam is collimated on its first reflection off the back surface of the second lens 24 in both the sagittal and transverse directions, so as to project an anamorphic pattern of constant height and sagittal width toward a grating 26 at the opposite limit. The correction provided by the double Mangin mirror system 20 tilts the reflected beam downwardly, as shown by the dotted marginal parallel lines. The grating 26 shown is a diffraction grating, capable of high diffraction efficiency. The diffraction grating 26 is set at the Littrow angle, here 58.2° to the central sagittal axis of the beam and bisects the image plane at a level below the anamorphic/collimator device 16. The diffraction grating 26 itself has a slight tilt, to reflect sagittally dispersed beams upwardly, again in the forward direction, to a second level (lower than the first) on the Mangin mirror system 20. In order to maximize diffraction efficiency for operation at channel spacings of less than about 50 GHz, the diffraction grating 26 has a dense grating line pattern, of the order of 1100–1200 lines/mm (in this example 1100 lines/mm). Furthermore, the impinging collimated but anamorphic beam pattern is sagittally dispersed across the surface of the grating 26, thus engaging a high proportion (>90%) of the grating lines on the surface. For optimizing diffraction efficiency the grating lines also vary from precisely transverse in the central region to tilt angles of up to 2° towards the end regions, since the grating is polarization dependent. With both polarization components being in parallel orientation to the grating lines, and in s polarization direction, there is minimal loss of diffraction efficiency.

The sagittally dispersed beams that diffractively reflect from the diffraction grating 26 are collimated in their return to the double Mangin system 20 where they are now tilted slightly upwards on reflection and caused to converge to define beam waists at a image plane which is at an elevation between the input/output optics 16 and the grating 26 within the housing 12. The modulator image plane in this instance is laterally displaced in the housing 12 from the principal beam paths, so the converging beams are reflected sideways off an angled pick off mirror 30 which is supported at the proper level on a mount 32 that extends upwardly from the bottom of the housing 12.

After reflecting off the pick off mirror 30, the pair of linearly polarized beams constituting the individual wavelength signals are of asymmetrical shape, but their major dimension is now in the transverse direction to the sagittal plane, having relatively small separation as they approach coincidence at the image plane at an inclination angle of 3° and 2°. Before reaching the image plane, the polarization components pass without attenuation through a polarizer element 34 with its optical axis disposed for full transmission of vertically polarized light, the state of both polarized beam components at this point. At the image plane the waists of the beam spots for each individual wavelength overlap and are approximately 10–11 microns wide by 150–250 microns tall, distributing the beam energy across the cell surface and keeping local power intensity in an acceptable range (<100 mW per wavelength). The polarized beam components then impinge on the individual cells 37 in the liquid crystal spatial light modulator (LC-SLM) array 38). Here, the liquid crystal cells 37 are of the zero twist nematic type, with a preferred "director" (rubbing axis) aligned at 45° to the s polarization direction. Advantageously, the narrow sagittal dimensions of the beam spots and the sagittal separation between spots, enables use of a compact LC-SLM array. Moreover, the pixels of the array can be mapped to beam spot locations in the sagittal direction.

The individual cells of the LC-SLM array 38 are separately amplitude controlled by voltage control electronics in conventional fashion, driven by a square wave signal of 4 to 20 kHz modulation frequency and 0 to 10 volts in amplitude. Control voltage levels for the cells may be derived in conventional fashion by power monitor and processing circuits 42 which receive an input DWDM signal, measure the power in each channel and provide corrective output signals to the voltage control electronics 40 to equalize gain. Input DWDM signals after monitoring are fed as shown to the input to the optical circulator 14, and after equalization may be supplied to other circuits or an EDFA (not shown).

The zero twist nematic cells 37 function as a variable phase retarder. In the full extinction mode, the LC cell plus the embedded retardation plate provide precisely a half wave of retardation in round trip. In this event the two polarization components are reflected back toward the system but are redirected or absorbed by the polarizer element 34. If the polarizer element 34 is a polarization beam displacer (PBD), the rejected energy is diverted out of the field of view of the output fiber. In a variable attenuation mode, operating at an analog level within a range which can be linearized by the voltage control electronics 40, the zero twist nematic crystal serves as a variable phase retarder. Here the elipticity and azimuth of the polarized beam components determine the proportion of energy that is blocked or diverted by the polarization sensitive device 34. The two polarization components per wavelength signal that are reflected from the cell 37 are again at 3° and 2° angles, but each moves along the incident path of the opposite beam. To this end the liquid crystal 37 is tilted slightly or incorporates a thin wedge element to control the angle of reflections, and to minimize unwanted back reflections.

Consequently the modified signals, whether extinguished or attenuated, are returned back through the optical system for refolding along paths reciprocal to the input paths. The separate polarization components maintain the small divergence angle until reaching the Mangin mirror system 20, where they are shifted into parallelism, for rediffraction upon reflection at the diffraction grating 26. The rediffracted beams after the diffraction grating 26 are converted to the collimated anamorphic beam and, after again reflecting off the Mangin mirror system 20, the convergent anamorphic beam is directed slightly upwardly through the beam polarization splitter 18. Here the two returning polarization components are returned to orthogonal polarization relationships and coincidence, and the wavelength components are recombined. The anamorphic lenses and collimator lens 16 thus form a DWDM output beam with equalized channels, which is transferred via the optical circulator 14 to an output waveguide (fiber) for propagation outwardly.

Figure 9:
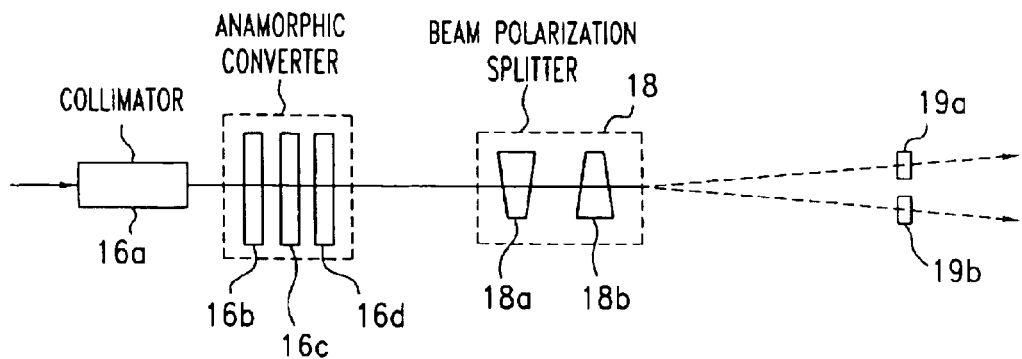
FIG. 9 is a side view of the elements of collimator anamorphic converter input optics and a Wollaston prism beamsplitter that may be used in the system of FIGS. 5–8.

Further details and features of the system are to be understood with reference to the diagrams of FIGS. 6–10, which show further details of the elements along the optical path. Referring initially to FIG. 9, a 1 mm (O.D.) collimator 16a element generates a downstream beam waist of 200 μm spot size at a forward distance of 10 to 15 mm. An anamorphic mode converter comprising three high index cylindrical lenses 16b, 16c, 16d, each having optical power in one axis, then introduce the geometric asymmetry or anamorphic shape in the beam cross-section. The output of this mode converter provides an elliptical beam waist, 10 microns by 200 microns, several millimeters after the last cylindrical lens 16d.

The beam polarization splitter device 18 in this example is an air-gap type of Wollaston prism positioned such that the elliptical spot occurs within the interior air gap of the beamsplitter. In one example, which can be used advantageously for 50 and 100 GHz channel spacing applications the beamsplitter 18 comprises two air spaced yitrium vanadate (YVO$_4$) wedges 18a, 18b at 3° divergences which, together with the mode converter in the anamorphic/collimator device 16 are tilted downward at 2.5° relative to the sagittal or horizontal (as seen in the Figures) plane of the optical system. The beamsplitter 18 provides as output two polarization component beams diverging at ±0.6° and of orthogonal polarization relative to each other. The beamsplitter 18 also includes a half waveplate 19a in the path of the horizontally polarized beam to rotate that beam to the vertical orientation. A glass plate 19b of equal optical path length is in the other beam path, to equalize optical path length and minimize PDL. The polarization of the two elliptically shaped and diverging beams are thus parallel to the vertical orientation, or s polarization. The Mangin mirror assembly 20 introduces cumulative corrections which reflect the diverging input pair of polarized beams as collimated anamorphic beams, deflected downwardly at 2.50° relative to the nominal horizontal plane. The beam patterns for each polarization component are only about 1 mm high, but about 20 mm or more in the sagittal direction.

Figure 11:
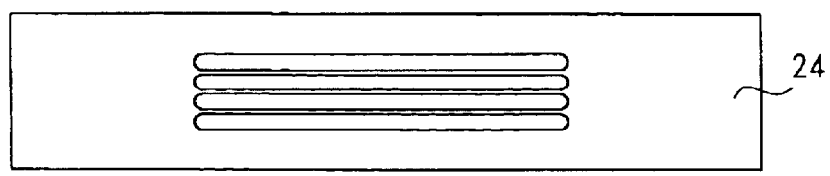
FIG. 11 is a simplified diagram of multiple low profile anamorphic beam patterns incident on the reflective surface of the Mangin mirror during operation of the system of FIGS. 5–9.

FIG. 11 demonstrates approximately (the drawing is not to scale) how the four low profile beam patterns project onto the reflective back surface of the Mangin mirror 24. With each anamorphic pattern only about 1 mm high, and with only 1 mm between the patterns, it can be seen that a system less than 2 cm high can support multiple refolded beams with dense patterns on the reflective surface.

The two elements 22, 24 of the Mangin mirror assembly 20 are configured for low optical aberrations such that the theoretical optical resolution is approached. In addition the design is optimized to image Gaussian beams with a ±2 degree field into diffraction limited spots, and to accommodate field of view requirements imposed by the need to image four beams (in this example). The highly dispersive diffraction grating (1100 lines/mm) imposes added requirements because of large angular deviations of the edge rays. The specifications of the elements of the Mangin mirror combination are as follows:

| Parameter | Lens 1 | Lens 2 |
|---|---|---|
| Material | Silica | Silica |
| Front Radius | 79.10 mm | 514.96 mm |
| Back Radius | 133.09 mm | 247.09 mm HR coating |
| Thickness | 11.60 mm | 35.27 mm |
| Image Plane to Lens 1 Distance | 38.06 mm | |
| Lens 1 to Lens 2 Distance | | 46.39 mm |

The parallel collimated beams from the Mangin mirror combination 20 after the first reflection are incident on the grating 26, which is oriented at 58.2 degrees such that the Littrow angle occurs at 1547 nm. The reflected central wavelength of 1545 nm is horizontal to the nominal plane, but in order to dispose all wavelengths from 1530–1565 nm in a horizontal plane at the image plane, the grating lines on each side of the incident beam are rotated up to 2° relative to the vertical. Other wavelengths are diffracted in the horizontal plane with ±2.5° of the Littrow wavelength. The diffracted beams that subsequently reflect off the Mangin mirror assembly 20 angle slightly upwardly but converge, with the separate s and p polarization components being at their slightly different (3.0° and 2.0°) angles, as they angle the pickoff mirror 34 toward the array 38. These angles are maintained until the two beam waists are superposed at the cell surfaces 38a at to the image plane at the LC-SLM array 38 (FIG. 10) after passing the polarization dependent element 34.

To minimize back reflections and achieve optimal performance, the elements of the system may be disposed in precisely adjusted locations, and angled in particular ways. For example the LC-SLM assembly 38 may incorporate a silica wedge (1.5°) which is tilted, with the assembly 38, so that the incident beams at 2.0° and at 3.0° each reflect back on the path of the other. The Wollaston beamsplitter is preferably aligned so that the optical path lengths of both polarized beams are equal as they exit the last surface. At the mode converter in the anamorphic/collimator assembly, an offset is used to assure that the mirrored surface of the Mangin mirror assembly 20 is at equal distances from the centerline of the mode converter.

Figure 10:
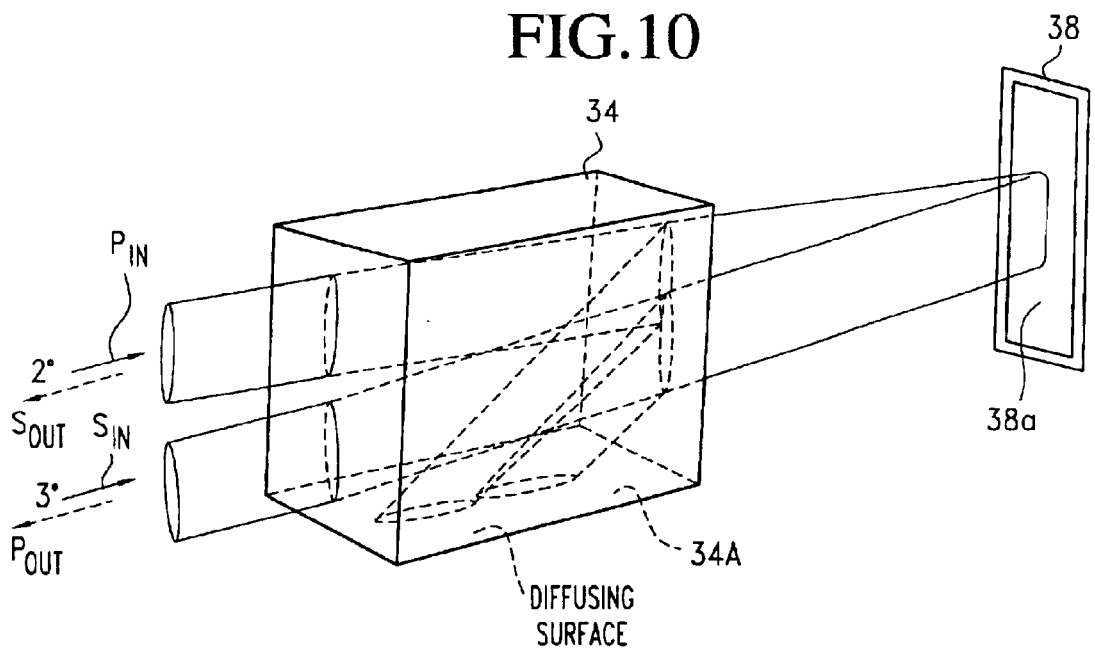
FIG. 10 is an enlarged, perspective view of one example of polarization management and liquid crystal cell optics showing an example of the beam paths of the two polarization components of a single diffracted wavelength optical signal at a liquid crystal cell.

Further details of the LC-SLM array 38 and the polarization sensitive device 34, and the manner in which they interact to the impinging incident beams, can be understood by reference to the fragmentary view of FIG. 10, which does not show half or quarter waveplates that may be used in conventional ways with liquid crystal devices. A polarization dependent device 36, such as a polarized plate (e.g. "Polarcor") has its optical axis oriented at 0° to the pixel array direction, while the optical axis of each LC cell is oriented at 45° to the pixel array direction. The cell is arranged to produce nominally zero polarization rotation under zero applied voltage, providing the transmissive state. At some greater voltage, the cell introduces 90° of polarization rotation, for the high extinction or rejection state at the device 34.

Intermediate voltage values provide a responsive range of attenuation values, and the control voltage may be adjusted by known expedients to compensate for nonlinearities in the response curves. With a polarization beam displacer 34 in place, and in the high rejection state, rejected beam power, whether fractional or full amplitude, is displaced at an angle in the PBD 34, and out of the field of view of the useful signal bema. A diffuse surface may be provided on the element to scatter the rejected beam power sufficiently and avoid intense heating of a supporting structure. Alternatively, the rejected beam power may be displaced from the input beam, to be directed back into the optical system to retrace the optical path to a location separate from the anamorphic/collimator 16 for dissipation or even as a diverted signal.

Each channel can be selectively attenuated as required for gain equalization in accordance with a known or measured gain wavelength profile. This profile can also incorporate the precompensation needed for both a pre-equalization EDFA and a serially disposed post-equalization EDFA, to provide a fully adjusted DWDM signal at an adequate power level for transmission.

Example: Gain Equalizer

Fiberoptic gain equalizers compensate for continuous gain and loss variation with wavelength across the transmission band. For example, EDFA amplifiers exhibit variations in gain with wavelength, temperature, aging and the number of channels. Therefore, an optical component placed before, after, or within an optical amplifier can dynamically alter the gain characteristics to achieve any desired response. Typically, a wavelength independent response is desired. In some cases, built-in optical channel monitoring functionality may be part of the gain equalizer.

The gain equalizer of this invention may advantageously utilize an identical optical design as the channel equalizer; the only difference is the pixel format of the LC-SLM. For example, a 4096 1-D pixel array with 1.8 um pixel pitch, fully reflective back mirror plane, and nominally half wave round-trip retardation has been utilized. This element consists of zero twist nematic liquid crystal cells in which the rubbing or alignment layer is oriented such that the optical axis of the cell is precisely parallel to the long axis of the LC array. To achieve the dense pixel pitch and the large number of pixels, the backplane is fabricated using standard silicon processing and lithographic techniques. The pixel width is selected to be less than the optical impulse response, the width of the optical beam at the LC-SLM image plane corresponding to a single wavelength of infinitesimal linewidth. This produces an optical response which is smooth and continuous, rather than pixilated according to ITU channels, as is typically the case for the channel equalizer. In this particular example, the $1/e^2$ width of optical impulse response is nominally 10 um, and the pixel pitch is 1.8 um. The interpixel gaps are sufficiently narrow (about 0.25 um) such that fringing fields impart a negligible effect on the optical response. These gaps are also highly reflective to maintain low insertion loss. This device utilizes a silicon back plane to economically achieve conductor routing for a large number of densely spaced pixels.

This same high pixel count LC-SLM can serve as a channel equalizer. Not only the attenuation, but also the attenuation slope within the passbands can be independently tailored. In addition, this device is channel spacing independent, as the widths of the passbands and stopbands can be arbitrarily controlled to within 3.5 GHz, which is the optical frequency spacing corresponding to the 1.8 um pixel pitch for a 600 lpm grating. The reflective backplane exhibits continuous high reflectivity even between pixels, so that no light is lost in the interpixel gaps. This is important in order to maintain low insertion loss.

Alternately, the identical LC-SLM used in the channel equalizer may be used herein for the gain equalizer. To synthesize a smooth response, the impulse response of the optical beam at the LC-SLM plane should be wider in the sagital plane, so that transmission ripple arising from the interpixel gaps is sufficiently small (<0.1 dB). Each pixel is nominally 28 um wide for 50 GHz channels, with a 3 um gap. By analyzing the convolution of the optical beam with the patterned reflector of the LC-SLM, the sagital optical beam width is preferably 30 to 35 um to maintain the highest level of resolution with the lowest passband ripple. The response rolls off 10 dB within about 100 GHz.

The optical beam is made wider by utilizing a different collimating lens design. An anamorphic lens may be used to achieve a spot size of 35 um wide by 70 um tall at the SLM. This approach further has the advantage that the electronics and optics (with the exception of a single input lens) are common among both the channel and gain equalizer components. This allows the technology platform to be leveraged across different product types.

Example: Bandsplitters and Combiners

Figure 13:
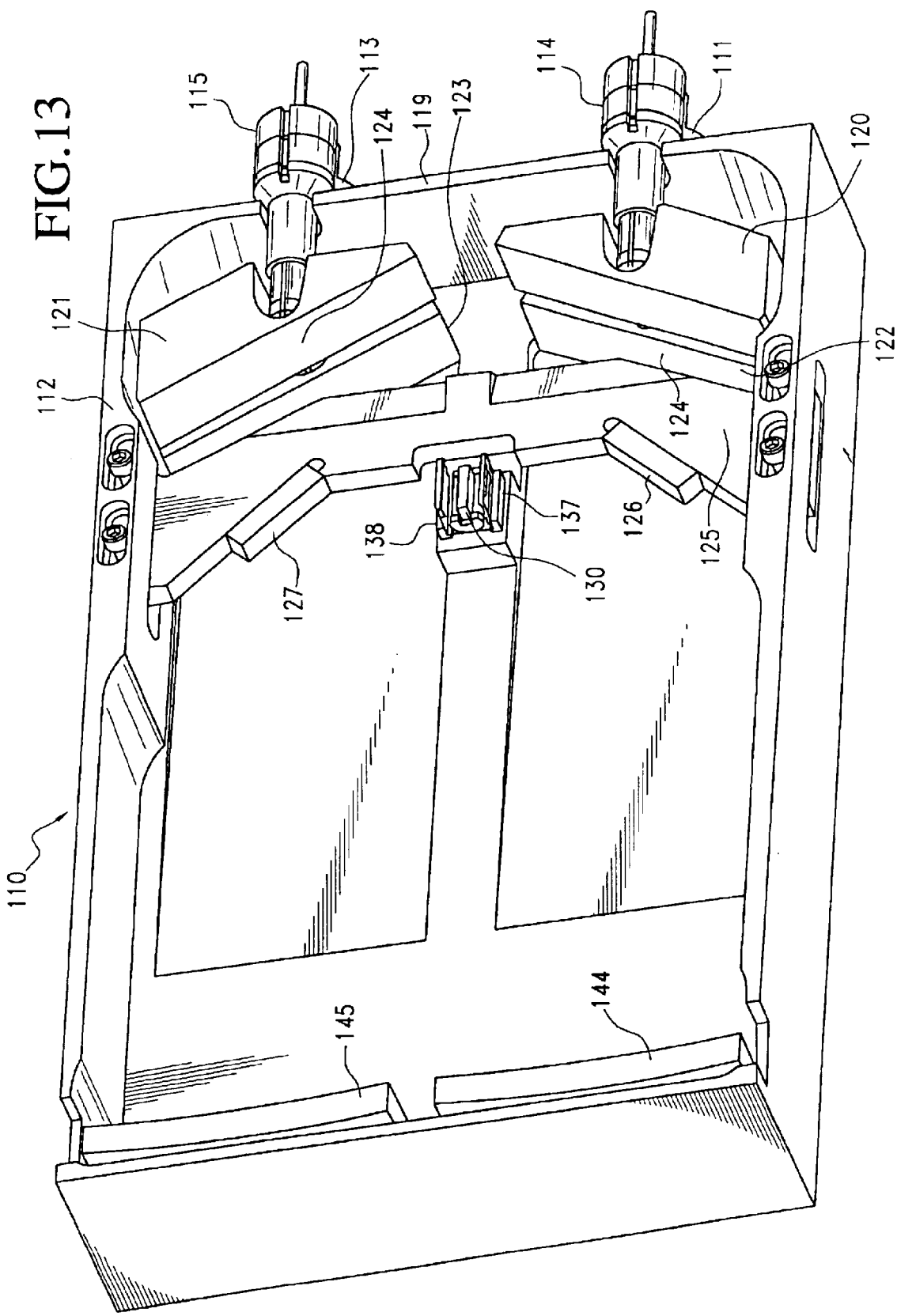
FIG. 13 is a perspective view of an alternate system using diffractive Fourier optics with separate input and return paths using three dimensional refolding and a patterned template for selective control of multiple channels.
Figure 14:
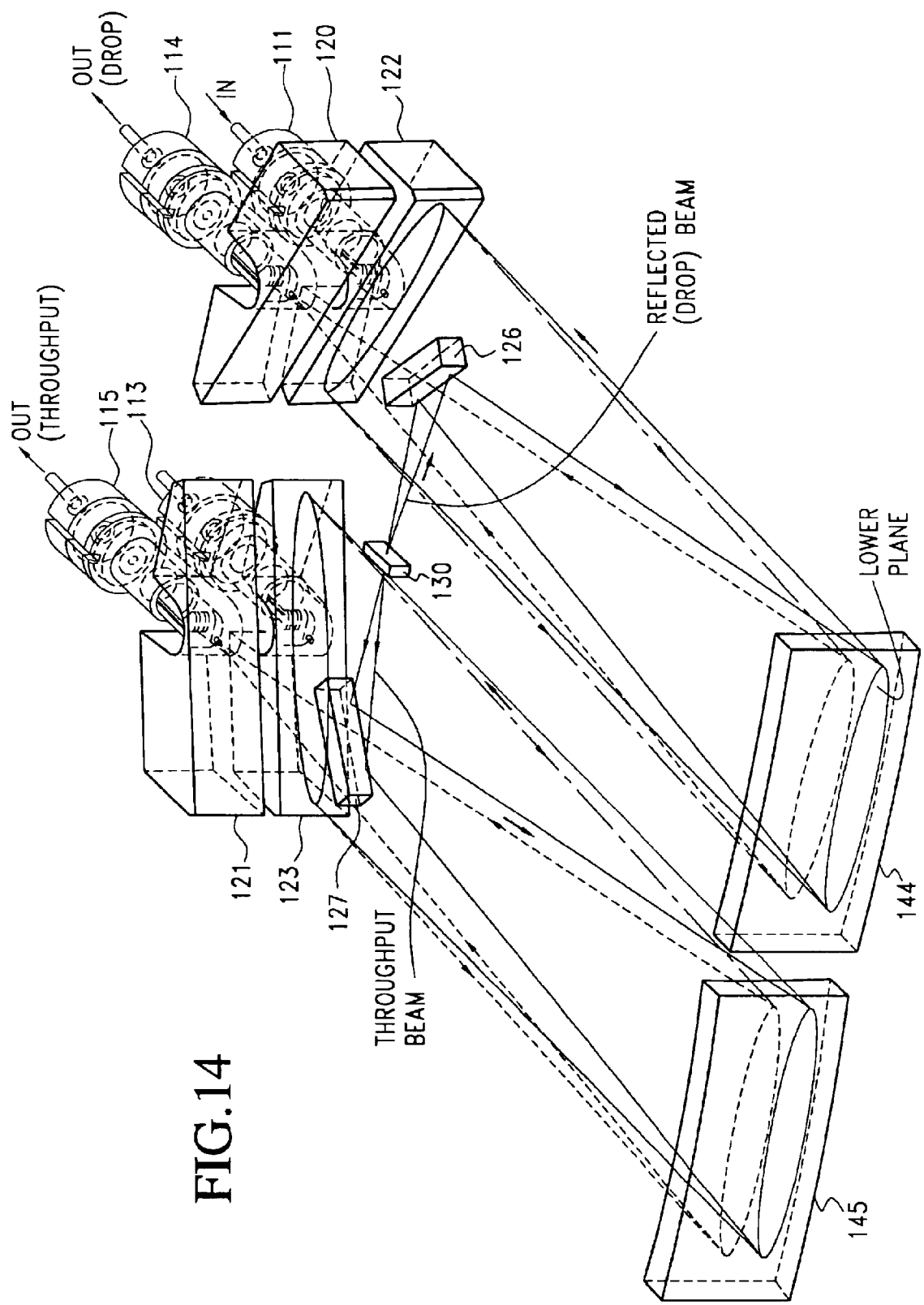
FIG. 14 is a different perspective of the system of FIG. 13, showing beam paths therein.
Figure 15:
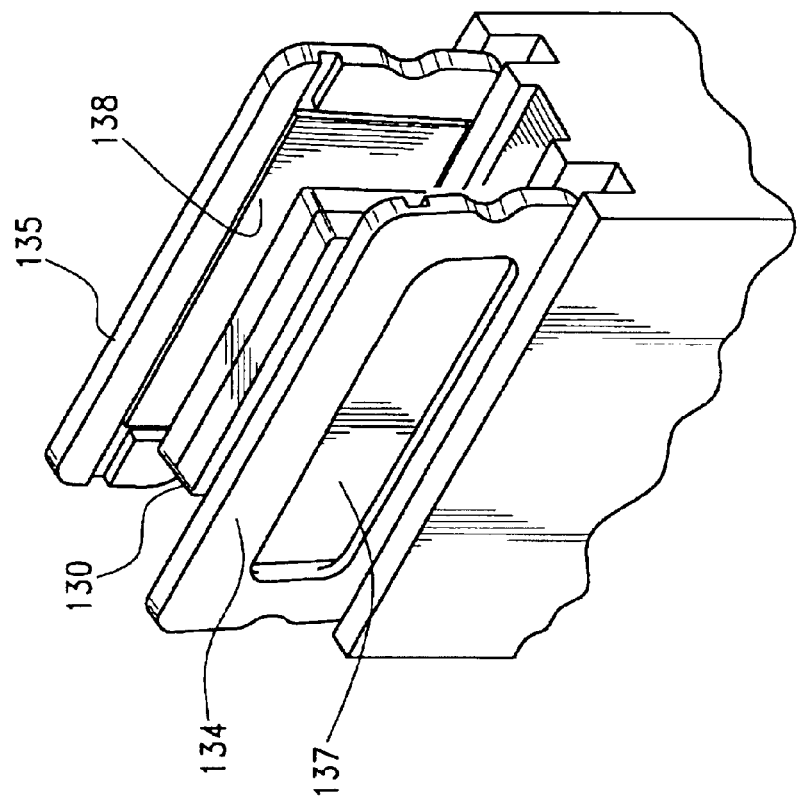
FIG. 15 is a perspective view of the arrangement of waveplates in relation to the patterned template in the system of FIGS. 13 and 14.

An example of a multi-wavelength diffractive Fourier filter for static or unchanging patterns of separation of predetermined wavelengths is shown in the perspective views of FIGS. 13 and 14. The major optical components of the assembly are chosen for the less stringent operating requirements of 50 GHz or greater channel spacing. Individual wavelength signals are modified by a template pattern rather than dynamic elements, to demonstrate the versatility of the concept, although it will be apparent to those skilled in the art that many implementations are feasible.

The diffractive Fourier optics filter 110 is again within the compact volume of a temperature stable housing 112 (the top of which is not shown) having four input/output ports (114, 115, 116, 117 mounted in pairs of different sides of one end wall 119. The two lower (this term is used only as a frame of reference since the unit may be in any physical attitude) ports 116, 117 here serve as separate outputs/inputs for the two different beam refolding sides of the unit. The two upper ports 114, 115 are also on different sides and define complementary output/input optics. The upper ports 114, 115 and lower ports 116, 117 each lie in upper and lower planes respectively relative to a median horizontal plane within the housing 112.

Each of the ports 114–117 includes interior collimating and anamorphic lens elements, as described in the prior example, between an exterior optical fiber and an internal access point leading into the housing 112. The ports 114–117 are each mounted to communicate with the internal beam path volume via separate microapertures or pinholes 124 in central regions of different reflective grating elements 120, 121, 122, 123 respectively, paired as spaced apart upper and lower gratings on each side of the housing 112. These are gratings at the Littrow angle, which have 600 lines/mm and are at 27.7° to the incident beam direction. The reflective grating faces of these elements 114–117 are slightly tilted to reflect images to a different plane, since the upper gratings 120, 121 line in an upper plane and the lower gratings 122, 123 lie in a lower plane, leaving a median plane in which a pickoff mount 125 is disposed. The mount 125 supports angled pickoff mirrors 126, 127 which are on opposite sides of a central template structure 130 (shown in more detail in the enlarged view of FIGS. 16 and 17) that is aligned with the vertical midplane of the housing 112. The template 130 support comprises a lower base mount 132, the sides of which are parallel to the central longitudinal axis of the housing 112, and below the median plane. The base mount 132 sides support waveplate carriers 134, 135 each of which retains a waveplate 137 or 138 that lies in a vertical plane along the longitudinal axis. The waveplates 137, 138 are on opposite sides of the static (i.e. fixed pattern) template 130 which is configured to transmit or block individual beams or beam sectors in the spatially dispersed array of diffracted beams.

Figure 16:
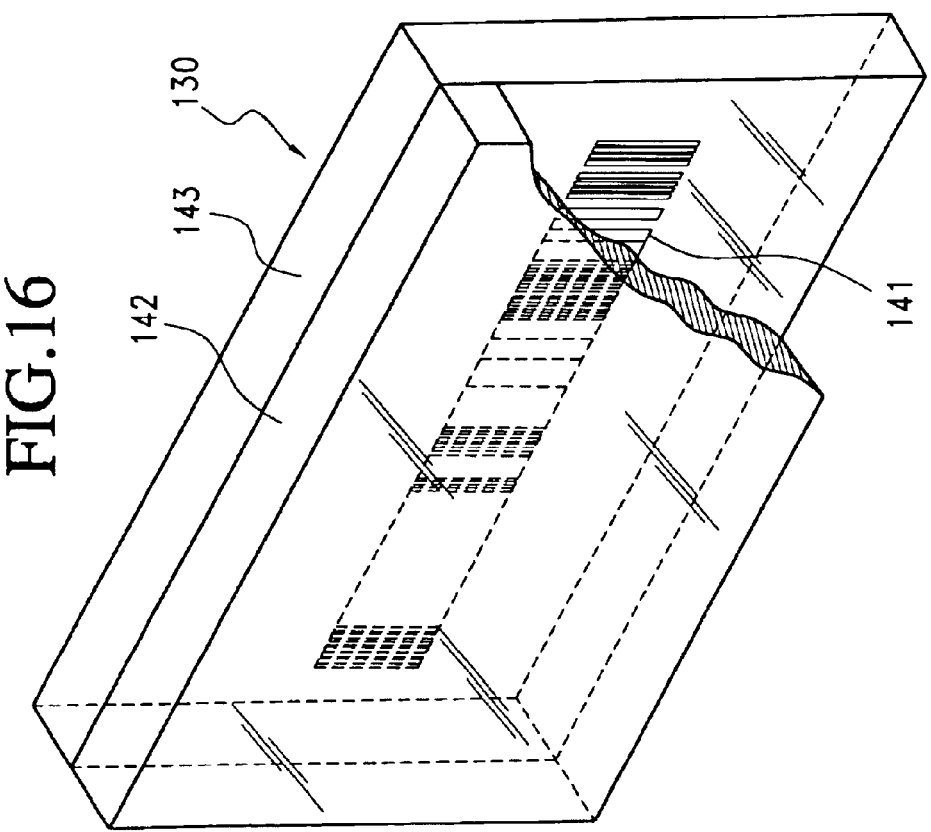
FIG. 16 is a perspective view of a microlithographic template that may be employed in the system of FIGS. 13 to 15.
Figure 17:
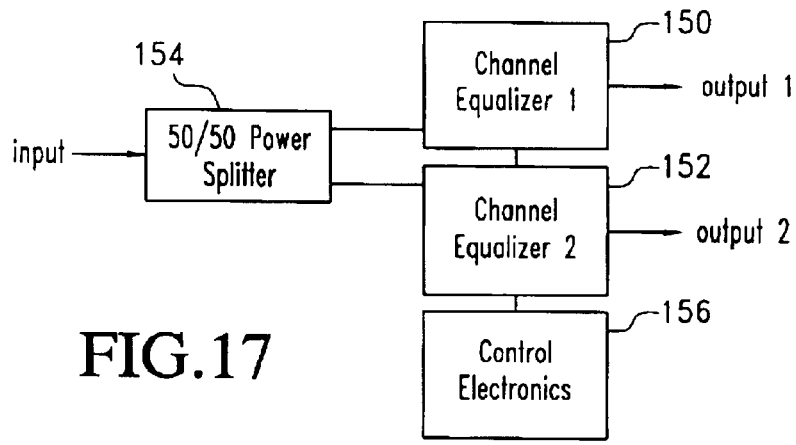
FIG. 17 is a block diagram of a programmable add/drop multiplexer employing a power splitter and a pair of channel equalizers in accordance with the invention.

Referring to FIGS. 16 and 17, the template 130 has reflective surfaces for drop wavelengths and, by way of illustration, spaced apart apertures or transmitting areas for throughput wavelengths. The array 141 of parallel reflectors, each define an elongated rectangular outline, which may be filled with a highly reflecting material such as gold, and which covers a selected individual channel or group of adjacent wavelength channels. The reflective array 141 is sandwiched between transparent substrates 142, 143, so that throughputs go through the reflectors and drop channels (in this instance) are reflected back.

Referring again to FIGS. 13 and 14, the refolding optical paths are formed between the diffraction grating pairs 120, 122 and 121, 123 at one path end and different ones of a pair of spaced apart Mangin mirrors 144, 145 at the other path end. The Mangin mirrors 144, 145 again have back surfaces with reflective coatings and will typically include anti-reflection coatings on their front surfaces. With wider channel spacings, the beam shaping and correction of a single Mangin mirror is typically sufficient for optical performance requirements. The radii of curvatures and the thickness of the glass body of the Mangin mirror assembly 144, 145 are selected to provide the refractive as well as deflective correction and directional control of impinging beams. This system also folds and refolds an input beam to provide all of the functions essential to the diffractive Fourier optics concept in a compact and versatile manner by repeated diffractive beam dispersion and combination to Fourier transform and restore images after wavelength manipulation.

FIG. 14 schematically shows the outlines of the beam paths, with multiple folding of beams from two input fibers through two separate halves of the diffractive Fourier optic system to two output fibers on opposite sides of the system. With the lower left 111 (as seen from the input/output side) of the input fibers feeding a diverging anamorphic beam through the microaperture 124 in the center of the lower left grating. The diverging beam strikes the first Mangin mirror 144 at the mirror's center plane, which coincides with the horizontal median plane of the optical system. At this point, the Mangin mirror 144 functions as a first collimating element and reflects an anamorphically shaped but collimated beam onto the first upper grating 120. The grating 120, since it receives the collimated beam at Littrow angle, then reflects it back, diffracted but collimated and parallel to its focal axis, to the first Mangin mirror 144. At the upper level the diffracted beam reflects again off the Mangin mirror 144, but is now convergent and angled downwardly toward the pickoff mirror 126, which is at the median plane of the template 130. The template 130 lies along the image plane of the converging beams at the median level of the optical system, and the wavelength varying diffracted components of the beam are spatially distributed across the template 130, so that each beam can be separately processed.

The template 130 divides the focused beams into drop and throughput channels by selective reflection of some channels back to the first pickoff 126, and transmission of the others through to the second pickoff 122. The paths of the reflected and throughput beams are symmetrically opposite relative to the vertical median plane of the optical system. Considering the reflected side of this symmetry, the reflected beam returns divergently to the pickoff mirror 26 on the input side of the system 110, then reflects back to the first Mangin mirror 144. At this point the pattern is at a lower plane, and the reflected or drop beams are refolded and directed reversely to span the lower grating 122. From this grating 122, the reflection of re-diffracted beams goes back to the median level of the first Mangin mirror 144, from which it is refolded and angled slightly upwardly, converging toward the upper grating 120 on the first side. The beams pass through the micro-aperture or pinhole 124 in the mid-region of the upper grating 120 and pass through the drop output 114.

On the second side of the system 110, throughput beams which pass the template 130 reflect off the angled second pickoff mirror 127 and follow a similar sequence of refoldings form the lower plane at the second Mangin mirror 145 to the lower grating 123 and back to the median plane at the second Mangin mirror 145 to return to the pinhole 124 in the upper grating 121 for output at the port 115.

It is immediately evident that if the template 130 is disposed with a microlithographic pattern which is alternately reflective and transmissive, the system 110 functions as an interleaver, dividing alternate channels into the different ones of two output fibers. Alternatively, channels can be disposed in a predetermined pattern or divided into two adjacent groups, thus providing a 1×2 splitter for the DWDM input signals.

It will also be appreciated that because of the symmetry of the system, either one or two inputs can be employed concurrently, and these can either be the upper or lower input/output ports, as desired for a particular application. Alternatively, the control elements at the local plane can be dynamically controllable elements, such as an array of transmissive liquid crystal elements.

Example: Optical Add/Drop Multiplexer

Add/drop multiplexers typically consist of arrangements of three port optical devices with an input, drop (or add) and throughput. This can be achieved by using a two port channel equalizer, combined with power splitters. Alternately, a three-port device can be fabricated using a double collimator and power redirecting polarization diversity optics in front of the LC-SLM. This approach has the advantage of utilizing shared cylindrical collimator optics to provide the anamorphic beam.

Figure 12:
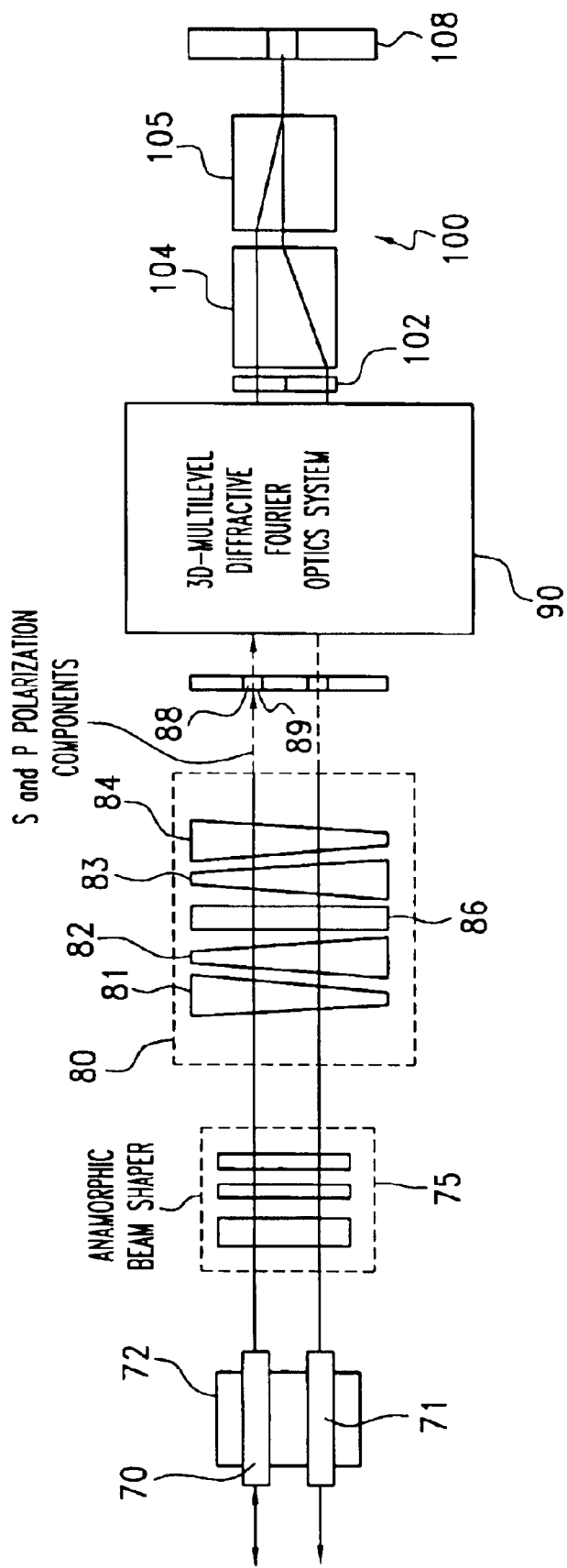
FIG. 12 is a combination side view and block diagram, generalized in some respects, of a different compact system in accordance with the invention for concurrently diffractively refolding beams from two different DWDM signals, and also employing a high numerical aperture Wollaston beamsplitter for two incident beams.

The versatility of the concept inherent in the compact three dimensional refolding scheme with low profile anamorphic beams is illustrated by the system of FIG. 12, which uses the capability for concurrent transmission of more than one beam at different levels in the beam path volume. Only unique portions of the system are shown in FIG. 12, and it is to be understood that given the general features of any chosen system (e.g. FIGS. 5–11 or FIGS. 13–14) any one of the examples of diffractive Fourier optics may be used. A pair of 1 mm O.D. collimators 70, 71, precisely mounted in a base 72 at different elevations are in-line with the group of three shared lenses in the set of anamorphic converter lenses 75 (as in FIG. 9). The input signal from the first collimator 70 is shaped into an anamorphic beam elongated in the sagittal plane (transverse to the plane of the paper). Shaped output from the anamorphic converter 75 is again split into two precisely diverging polarized beam components (s and p polarization), but in a single or double Wollaston beamsplitter 80. The double Wollaston beamsplitter 80 shown in FIG. 12 may be advantageous in providing a high numerical aperture device, one independent of beam incidence location on the beamsplitter. The device 80 comprises two beam pairs of birefringent (YVO$_4$) wedges 81, 82 and 83, 84 respectively, the wedges of each pair being oppositely tapered and having taper angles of 2.5°. The two pairs of optical wedges 80, 81 and 83, 84 respectively are separated by a quartz half waveplate 86. Consequently, an incident DWDM beam may enter the beamsplitter 80 in either direction at a lower or higher elevation, but in either event encounters nominally equal path lengths between the two wedge pairs independent of where the beam enters. The quartz half waveplate 86 rotates the two polarization components by 90° between the two wedge pairs, and in the forward direction the s and p polarization components exit at a less than 2.00 separation angle. In the reverse or return direction separated polarization components are again, as in the prior example, placed in parallelism with equal optical path lengths by subsequent half waveplate 88 and path length equalizer elements 89 in the forward direction. The diffractive Fowier optics system 90 then spatially distributes the wavelength components of the input DWDM signal as they converge toward polarization management optics 100. Here the separate polarization components propagate first through a waveplate 102, and thereafter pass successively through a pair of PBDs 104, 105 with optical axes orthogonally disposed relative to the beam polarization direction.

The first PBD 104 has its optical axis oriented to transfer the beams straight through without angular deviation, but the second PBD 105 angles the beams downward to the level of an LC-SLM cell 108. The same paths are used at all other sagittally dispersed individual wavelength signals and their respective cells in the LC-SLM array. The LC cells 108 each transform the polarization of the incident beams by that amount needed for signals to be dropped. The drop signals pass through the second PBD without deflection, but when they reach the first PBD 104, they angle to the lower elevation to a level corresponding to that of the lower collimator 71. The precise 1 mm spacing between the collimators is equaled by using two PBDs 104, 105 of 7.07 mm thickness and diagonal displacement of one optical axis relative to the other. The throughput signals reflected from the cell 108 are not rotated or transformed in polarization so they retrace the incident path through the second PBD 105 and then the first PBD 104. The parallel sets of drop and throughput beams then retrace the refolding paths through the diffractive Fourier optics system 80, the beamsplitter 86, and anamorphic beam shaper 75 to the separate collimator 71.

Example: Optical Add/Drop Multiplexer with Channel Equalization

In practice, it can be challenging to achieve excellent blocking (40 dB) as well as low reflection in the transmit state (<0.01%) in the same device. Therefore, it may be advantageous to separate the block and transmit functionalities. One implementation of a fully functional, dynamic optical add/drop multiplexer in which the attenuation on the add, drop and throughput ports can be arbitrarily configured in a channel independent fashion is described next. Referring to FIG. 17, channel equalizers 150, 152 are arranged to provide programmable add/drop functionality as well as channel by channel attenuation adjustment. This is achieved by joining two dynamic channel equalizers 150, 152 in parallel with the outputs of a 50—50 power splitter 154. This arrangement includes control electronics 156 for governing the individual channel operations in each of the two equalizers 150, 152. The channel equalizers 150, 152 may operate in a complementary fashion with one equalizer extinguishing channels, while the other equalizer attenuates channels as needed. Any combination of wavelength channels can then be dropped or added at a particular location.

Gain equalizers may also be used in tandem with one or more fiber amplifiers, such as EDFAs, to equalize the gain in the channels, transmitted through the amplifier system. Typically, the equalizer will be in series with both an input EDFA and an output EDFA so as to compensate the characteristics of the first and precompensate the characteristics of the second. This insures that adequate balance of power at each channel is maintained in the channels as they propagate throughout the network and as the signals are subjected to wavelength dependent loss arising from the fibers attenuation profile, wavelength dependent amplifier gain, or wavelength dependent component losses.

When dynamic channel equalizers/blockers and other channel controls in accordance with the invention are employed with optical circulators, they can provide add/drop wavelength capabilities at some signal loss (typically 1.0 to 1.5 dB loss per round trip through the component. If two closely separated collimators are employed, together with beam splitting polarization diversity optics, then circulators can be added to provide the desired add, drop and throughput functionalities. Drop signals reflected back after signal blocking in the optics to a first circulator go to the designated output. The throughput wavelength signals go to a second circulator and to the throughput terminal.

Figure 18:
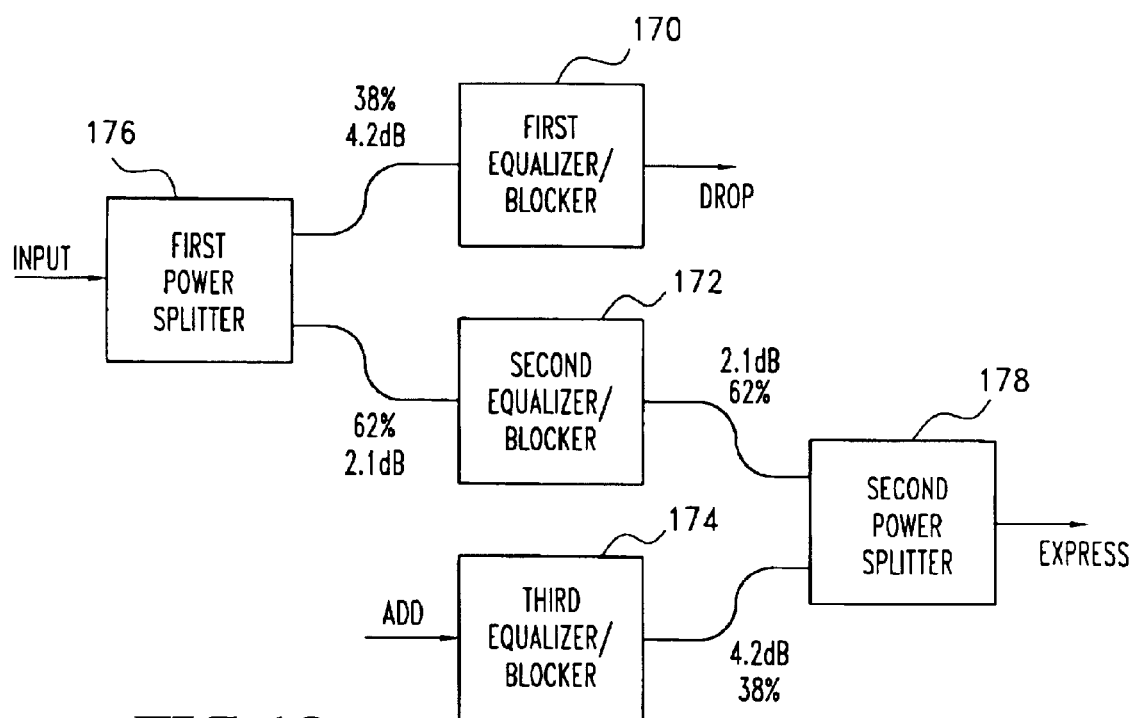
FIG. 18 is a block diagram of a system using three channel equalizers and two power splitters in a four port configuration for providing add, drop and throughput outputs.

One, two or three reflective equalizer/blockers may be used with wavelength independent power splitters to provide add/drop and throughput capabilities with limited or full equalization. FIG. 18 depicts the full equalization capability, using three equalizer blockers 170, 172, 174 and two wavelength independent power splitters 176, 178. The splitters can be fused couplers with a splitting ratio of 38:62, giving 4.2 dB and 2.1 dB loss respectively. The splitting ratio is selected to balance the losses from serial components in transmission to the express, drop and add ports.

Thus the input signals are fed to the first splitter 176, which provides 38% input to the first equalizer/blocker 170, the blocked wavelengths being the drop output. The 62% brand output from the splitter 176 is applied to the second splitter/combiner 178. The wavelength components in channels output from the second equalizer/blocker 172 have been attenuated 4.2 dB, equal to the attenuation of add signals at the 38% arm of the second splitter 178. The equalizer/blockers provide independent blocking or attenuation control of each channel in the drop, express and add ports.

If only one splitter and two equalizer/blockers are to be used, then the express signals can be equalized but add signals are simply combined. Output power balancing with the addition of unequalized add signals is also feasible if one arm of a splitter for the input signal feeds a drop output, and the other is applied to a dynamic equalizer/blocker, the output of which is supplemented by unequalized add signals on the available channels in an appropriate power ratio.

The arrangements of FIGS. 17 and 18 thus demonstrate the feasibility of systems that employ the functionalities of circulators or splitter together with the dynamic channel controls of equalizer/blockers to provide add/drop and throughput functions alone, or with added equalization. Those skilled in the art will recognize that the same capability of these subunits can also be employed in other combinations, with more or fewer input and output ports, to provide a variety of routing and switching functions.

System Performance Benefits Resulting from Equalizer Features

The superior optical performance of these various fiber coupled grating spectrometers enables dramatic improvements in system performance and wavelength management capabilities. The low loss (3–4 dB) results in less need for reamplification. The low inherent chromatic dispersion of the device (<10 ps/nm) does not compromise the dispersion budget, which results in less frequent electronic regeneration. The flat passbands (0.1 dB) allow the add/drop to be cascaded in a ring type network where passband narrowing effects must be avoided. Furthermore, high channel extinction (>40 dB) eliminates any system penalty arising from coherent crosstalk. The low profile design (<20 mm tall) enables this enhanced functionality within a limited volume. This device offers independent control of attenuation for each channel using simple control algorithms. Unlike programmable Fourier synthesis type filters, this design does not suffer from potential liquid crystal reset issues (discontinuities in phase for transitions through $\pi$ retardation) and is optically transparent in the power-off state.

Period and Phase Tuning by Modifying Ambient Pressure

The wavelength dependent diffraction angle is also a function of the index of refraction of the surrounding atmosphere. For an air atmosphere, the index exhibits a relatively strong dependency on air pressure. Note that air exhibits $<10^{-5}$ index dispersion across the 1500 to 1600 nm wavelength range. As the atmospheric pressure is reduced, the index decreases linearly from the 1 atm value to the vacuum index.

The mapping of each particular wavelength onto a location on the LC-SLM plane depends of several factors dependent on the optical design. The index of refraction of the atmosphere surrounding the spectrometer can shift the location of each wavelength. Air at 20° C. and 1 atm has an index of refraction of 1.0002926 (D line). If air is replaced with 1 atm He, with an index of refraction of 1.000036 (D line), the absolute frequency shifts approximately −50 GHz. Alternately, if air is replaced with $CO_2$, with index of refraction of 1.000451 (D line), the absolute frequency shifts approximately +30 GHz. Therefore, by altering the composition of the atmosphere, the absolute frequency of the channel equalizer can be shifted during final packaging. Moisture corrections to dry air index values are made by Lorentz's formula: +0.000041 ($P_{H2O}$/760), where $P_{H2O}$ is the vapor pressure in mm Hg. Humidity variation can therefore produce up to 8 GHz of absolute frequency shift. Note that this also produces about 2 GHz of center frequency walk-off from channel one to channel hundred.

Figure 19:
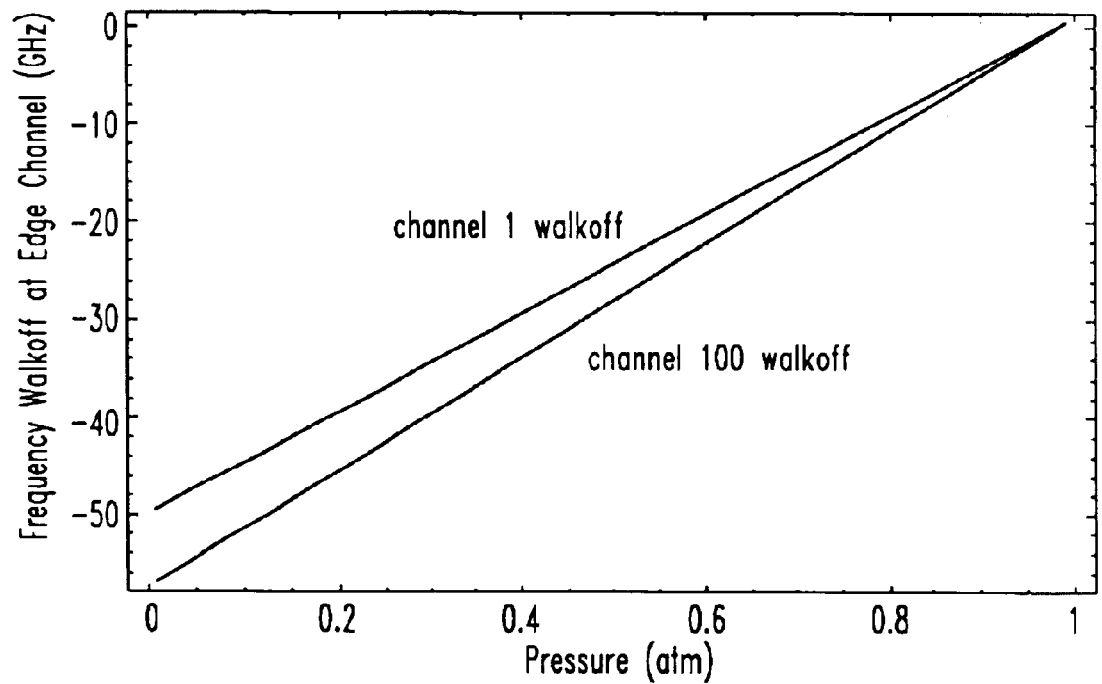
FIG. 19 is a graph of the dependence of frequency period on pressure of the surrounding atmosphere.

A change in atmospheric pressure/composition changes both the absolute frequency and the frequency period. FIG. 19 illustrates the effect of a reduction in pressure from 1 atm to vacuum within the optical package. Note that channel 1 and channel 100 (for 50 GHz channel spacing) walk-off in frequency by different amounts. Therefore, in addition to the phase, the period also changes. Practical pressure tuning is therefore limited to about +/−0.1 atm, to maintain frequency walk-off below +/−2 GHz while phase tuning over a +/−10 GHz range.

In summary, the DWDM control systems for individual wavelength signals described herein address several needs of next generation optical networks not met by present components and systems. The diffraction grating approach achieves wide passbands and precise stop bands necessary for 25, 50 and 100 GHz operation, in contrast to component technology which generally does not scale well at channel spacings of 50 GHz and below. Second, the compact, three dimensional refolding concept provides great versatility, in enabling systems to be realized which have different numbers of inputs and outputs. Third, the approach is a relatively low cost answer for large scale deployment of new components technologies. It has a relatively simple optical system with a low parts count and enables a wide variety of low cost manufacturable solutions of problems to be made available. Fourth, the functionalities of wavelength dependent attenuation and wavelength management are expected to find wide deployment in next generation optical networks. Fifth, since spatially distributed and distinct diffracted wavelength signals are provided, any of a number of suitable spatial light modulators, including MEMs and micro-mechanical light diverters may be used. Thus devices and methods in accordance with the invention open wide possibilities for analog and digital control employing signal attenuation, equalization, switching and routing of signals.

What is claimed is:

1. The method of separately directing individual wavelength signals from an optical DWDM beam to be modulated at different positions along an image plane, comprising the steps of:

forming a wide, low profile DWDM beam;

tightly refolding the beam at least twice in the low profile direction while diffractively dispersing components in a wavelength dependent manner; and delivering spatially separated wavelength components of the beam at different positions along the image plane as areal images which are elongated relative to the folding direction.

2. A method as set forth in claim 1 above, further including the steps of separating the DWDM beam into polarization components closely spaced in the low profile direction, and recombining the polarization components for each wavelength component at the image plane.

3. A method as set forth in claim 2 above, wherein the beam widths at each refold are substantially parallel to a given axis, and closely separated relative to that axis, and wherein the separated polarization components for a beam converge to superimpose at the image plane.

4. A method as set forth in claim 1 above, wherein the wide, low profile beam is formed from the image at an input plane, and wherein the components at the image plane are transforms of the image at the input plane.

5. A method as set forth in claim 1 above, including the steps of modifying the wavelength components at the image plane and providing a modified DWDM beam by tight refolding of components with rediffraction.

6. A method as set forth in claim 5 above, including the steps of reflecting polarization modified wavelength components, and rejecting portions of the components in accordance with their polarization after modification and before rediffraction.

7. The method of modifying individual wavelength signals of a DWDM beam with low insertion loss, low crosstalk and flat passbands, comprising the steps of:
propagating input beam images from an input plane as sagittally spread, transversely narrow anamorphic beam patterns;
successively tightly refolding the anamorphic beam patterns along a central transverse plane with a volume of limited transverse dimension;
during the refolding, diffractively dispersing the wavelength components within the anamorphic pattern;
converging sagitally distributed wavelength components to form beam waists at an image plane, with the beam waists imaging the images at the input plane;
modifying the wavelength components at the image plane; and
returning the modified wavelength components to form an output DWDM beam by reversely refolding and redififacting the beam pattern.

8. A method as set forth in claim 7 above, wherein the wavelength components are individually modified by selective phase retardation and portions of the components are rejected in correspondence to the amount of phase retardation.

9. A method as set forth in claim 6 above, wherein the step of diffractively dispersing comprises high resolution diffraction centered along the transverse plane and along the Littrow angle and the step of converging sagitally distributed wavelength components maps the components to non-constant separations along the image plane.

10. A method as set forth in claim 9 above, wherein the step of modifying the wavelength components comprises reflecting the components with controlled ellipicity, and rejecting portions thereof in accordance with ellipicity before returning the components for refolding and rediffraction, and wherein the rediffraction reunites wavelength components into a single beam.

11. A method of using spectrometer dispersion of multi-wavelength optical signals employing at least one diffraction grating, to provide modified signals with sharp spectral roll aft, adjacent channel crosstalk and low PDL and PDF, comprising the steps of:
directing a two dimensional pattern of the multiwavelength signals through an optical correction sequence employing at least two spherical corrections and reflections;
directing the thus corrected pattern as a two dimensional beam to reflect back from a grating at the Littrow angle to repeat the optical correction sequence with a diffractively dispersed pattern of wavelength signals;
directing the dispersed wavelength signals as linearly separated, diffraction limited optical beams incident on a modulator plane; and
modulating the separate beams at their locations at the modulator plane.

12. A method as set forth in claim 10 above, wherein the optical correction sequence employs four spherical corrections and a reflection, and wherein the method further includes the steps of separating polarization components in the multiwavelength signal before the spherical corrections, and comprising the polarization components at the modulator plane.

13. The method of individually modifying the channel signals in a wavelength division multiplexed input beam comprising the steps of:
repeatedly refolding the input beam along a beam path volume to provide, successively, a forwardly directed diverging anamorphic beam having a high sagittal width to height ratio within the beam path volume, a reversely directed collimated anamorphic beam, a forwardly directed anamorphic diffracted beam with diffracted beam components dispersed in the sagittal direction, and a reversely directed convergent dispersed beam in which the diffracted beam components have a height to at least equal sagittal width; and
individually modifying the dispersed components of the convergent beam.

14. A method as set forth in claim 13 above, wherein the diverging anamorphic beam is refolded at a first given plane parallel to the width of the anamorphic beam pattern and within a beam path volume of limited height in the direction perpendicular to the first plane, the collimated beam is refolded as a collimated diffracted beam at a second plane, separated in height from the first within the beam path volume, the diffracted collimated beam is refolded at a third plane spaced in height from the first plane within the beam path volume, and the diffracted convergent beam is diverted from the forward and reverse directions within the beam path volume for individual modification of the diffracted components.

15. A method as set forth in claim 13 above, wherein the diffracted convergent beam comprises a plurality of spatially separated spectral component beams wherein each constitutes a different wavelength signal, wherein the refolding steps each include angling the reflected beams toward a different levels during folding and refolding, and wherein the modification step comprises reflecting the different wavelength signals with controlled modulation of gain.

16. A method as set forth in claim 15 above, wherein the forwardly directed diverging anamorphic beam is input into the beam path volume from a given level, the repeated refoldings are at different levels, the spectral components are dispersed in the direction of the width of the anamorphic beams, and wherein the diffracted convergent beams are recombined after reflection in the region of the input region of the forwardly directed diverging beam.

17. A method as set forth in claim 13 above, including the further steps of returning the beam to a wavelength division multiplexed state by repeatedly refolding and beam shaping diffracted beam components after modification, in a reverse sequence to that employed for the input beam.

18. A method as set forth in claim 17 above, wherein the beam after modification of different components is reflected back into the beam path volume and redirected through the reverse refolding sequence in a return path with reciprocal refolding steps in the same volume to provide a combined and modified wavelength division multiplexed output signal within a selected height within the beam path volume.

19. A method as set forth in claim 18 above, wherein the modification step comprises dynamically equalizing the power levels of the spectral components of the wavelength division multiplexed beam.

20. A method as set forth in claim 18 above, wherein the modification step comprises dynamically extinguishing selected wavelength components of the wavelength division multiplexed beam.

21. A method as set forth in claim 17 above, wherein the step of modifying the wavelength components comprises transmitting selected wavelength components into a second beam path volume and the method includes the steps of effecting the return refolding sequence in the second beam path volume.

22. A method as set forth in claim 21 above, wherein the modification step further comprises reflecting wavelength components back through the refolding sequence in reverse directions in the first beam path volume and transmitting other wavelength components through the repeated refolding sequence in the second beam path volume.

23. A method as set forth in claim 17 above, further including the step of diverting at least some modified spectral components to a different level in the beani volume and refolding the said components through the beam volume in the reverse sequence but to a different region than the input beam.

24. A method of dispersing the wavelength signal components in a WDM optical beam for individual modification, the optical beam having an arbitrary state of polarization, the method employing a diffractive grating and an opposed concave reflector, wherein the grating has grating lines substantially transverse to a sagittal plane, comprising the steps of:

separating the WDM beam into orthogonally polarized beams diverging at an angle less than about 2°;

converting the separated polarized beams to like polarizations;

directing a pair of collimated anamorphic beam patterns of the separate polarization components that are elongated in the sagittal direction and adjacent but separated in the transverse direction against the diffractive grating, with the polarization direction substantially parallel to the grating lines;

converging diffracted wavelength components dispersed by the diffractive grating off the concave reflector to form individual beam waists of each pair of polarization components at a focal plane, and modifying the individual wavelength components by polarization rotation at the focal plane.

25. The method as set forth in claim 24 above, wherein the step of converting the beams to like polarization comprises splitting the optical beam into s and p polarization components, rotating the p polarization components into parallelism with the s components and both in parallelism to the grating lines on the grating, and the step of modifying the individual wavelength component comprises rotating the beam polarization components by selected amounts, while reflecting the components and rejecting portions of the components depending upon the directions of polarization thereof.

26. The method as set forth in claim 25 above, further including the steps of rediffraction of the modified wavelength components to form separated composite beam patterns, recombining the polarization components, and reconverging the recombined polarization components of each wavelength signal with other modified wavelength signals.

27. The method as set forth in claim 26 above, wherein the diffractive grating is polarization sensitive and wherein the pair of anamorphic beam patterns are closely adjacent and of low profile in the transverse direction and substantially span the grating in the sagittal direction.

28. The method as set forth in claim 27 above, wherein the WDM beam has channel spacings in the range of about 50 GHz or less, and wherein the step of recombining each wavelength signal with other wavelength signals precedes recombining polarization components, and wherein the anamorphic beam patterns reflected on the concave reflector are about 1 mm or less and separated by about 1 mm or less, in the transverse direction.

29. The method of effecting control of individual channels in a wavelength division multiplexed optical signal using at least one reflective grating having a two dimensional surface area and at least one spaced apart and opposing reflective concave surface, each having sagittal and transverse dimensions, comprising the steps of:

launching the optical signal input field as a diverging optical beam of anamorphic character into the spacing between the opposed surfaces with the width of the anamorphic pattern being substantially parallel to the sagittal dimension, redirecting the beam as a collimated anamorphic pattern with an optical power which is a Fourier transform of the input field onto a two dimensional area of the grating to return a high efficiency collimated diffracted beam with dispersed wavelength components onto the reflective concave surface and converging the dispersed components of the beam into a spatially linear distribution of spectral components;

selectively controlling the individual spectral components, and transforming the field in accordance with an inverse Fourier function while diffractively recombining the controlled spectral components.

30. A method as set forth in claim 29 above, for effecting control within a small volume, wherein the beam patterns are reflected between the reflective surface and grating at different levels and the height of the anamorphic beam is at least an order of magnitude smaller than the sagittal width.

31. A method as set forth in claim 30 above, wherein the method further includes the steps of separating the spectral components in the sagittal direction and shaping the separated spectral components such that each has a substantial height to width ratio relative to the sagittal dimension, separating polarization components of orthogonally related orientation prior to the control step, and recombining the polarization components of the spectral components before recombining the spectral components.

32. A method as set forth in claim 31 above, wherein the components are selectively controlled within a predetermined field of view, and the method further includes the step of rejecting portions of the spectral components subsequent to the control step before recombination of the spectral components.

33. A method as set forth in claim 32 above, wherein the spectral components are reflected in the control step, and wherein the reflected components are inversely transformed and diffractively recombined by refolding the components between the opposed surfaces.

34. A method as set forth in claim 32 above, wherein the control step is used to extinguish selected spectral components.

35. A method as set forth in claim 32 above, wherein the control step is used for selective attenuation of spectral components.

36. A system for controlling the individual channel signals in a wavelength division multiplexed input optical beam, comprising:

an optical interface structure in an input region and having an input optical circuit, and an output optical circuit, the optical interface structure including an anamorphic optical device positioned to direct the input optical beam at an acute angle relative to a sagittal plane as a diverging anamorphic beam having its wide dimension parallel to the sagittal plane;

at least one concave reflector disposed to span the sagittal plane at a selected distance from the input region and having a reflecting face of sufficient area to encompass the anamorphic beam at different transverse positions relative to the sagittal plane, the reflector having an optical power to converging reflect a collimated anamorphic beam at an acute angle to a different transverse level relative to the plane of the optical interface structure;

at least one reflecting diffractive element disposed at the input region and having an areal face positioned to receive the collimated anamorphic beam and angled relative to the sagittal plane to reflect an impinging anamorphic beam pattern as first order diffracted beam components dispersed in the sagittal plane back toward the reflector, wherein the reflector reflects a beam of converging dispersed components toward a predetermined level relative to the sagittal plane, and a multichannel control device at the predetermined level intercepting the converging diffracted beam components and separately controlling at least some of the diffracted beam components.

37. A system as set forth in claim 36 above, wherein the at least one concave reflector comprises at least one element having refractive optical power, and wherein the at least one reflecting diffractive element comprises a Littrow grating at the Littrow angle with in excess of about 600 lines/mm.

38. A system as set forth in claim 37 above, wherein the Littrow grating has rulings normal to the wide dimension of the collimated anamorphic beam, and wherein the wide dimension of the anamorphic beam encompasses a sufficient length of grating to provide a diffraction efficiency of greater than about 90% or more.

39. A system as set forth in claim 37 above, wherein the multichannel control device comprises an array of liquid crystal cells spanning the predetermined level relative to the sagittal plane, polarization management optics adjacent each of the cells, and an optical structure in the path of the converging diffracted beam components for directing said beam components into the cells of the array and beam components reflected therefrom back through the mirror and diffractive element combination to the optical interface structure.

40. A system as set forth in claim 36 above, wherein the at least one concave reflector comprises a pair of spaced apart optical elements having spherical lens surfaces, and including a beam terminating reflector surface on one of the spherical lens surfaces to form a Mangin mirror structure of high connective capability.

41. A system as set forth in claim 36 above, wherein the optical interface structure further includes at least two parallel optical interface structures spaced apart in the direction transverse to the sagittal plane for directing at least two optical beams of anamorphic shape concurrently therethrough, wherein the multichannel control device directs reflected beam components at two different levels back to the at least one concave reflector and at least one reflecting diffractive element.

42. A system as set forth in claim 41 above, wherein the parallel anamorphic beams are each of the order of 1 mm in transverse dimension and separated by a distance of the order of 1 mm, and wherein the control device comprises polarization beam displacers for directing reflected beam components to two different levels.

43. A system as set forth in claim 42 above, wherein the grating is a single grating at the Littrow angle having about 1100 lines/mm and transversely displaced from the level of the optical interface structure, wherein the Mangin mirror includes two spaced apart lens elements with two spherical surfaces each, the back surface of one of which is reflective.

44. A system as set forth in claim 43 above, wherein the multichannel control device comprises an array of zero twist nematic crystal cells positioned in the sagittal direction and positioned in the sagittal dimension such that the converging dispersed components are approximately centered in the cells of the array.

45. A system as set forth in claim 36 above, further including a polarization responsive beam splitter device in the path between the optical interface structure and the at least one concave reflector, configured to diverge orthogonally polarized beam components of the DWDM beam into narrowly diverging beams in the input direction, and to combine polarization components in the output direction.

46. A system as set forth in claim 44 above, wherein the array of cells are disposed in spaced apart relation to the concave reflector and reflecting diffracting element and the optical structure for the diffracted beam components at the array of cells comprises a pickoff mirror angled to direct the converging diffracted beams at an angle against the pickoff mirror, and to the array.

47. A system as set forth in claim 36 above, wherein the optical interface structure comprises separate anamorphic/collimator ports at different levels transverse to an intermediate sagittal plane therebetween, the concave reflector comprises a pair of mirrors at different sagittal sides, the at least one grating comprises different grating surfaces on opposite levels relative to the intermediate plane and individually in the optical path between the separate anamorphic ports and the mirror, and each grating surface includes at least one interior aperture encompassing the optical path associated therewith.

48. A system as set forth in claim 47 above, wherein the multichannel control device includes an array of cells sagittally positioned at the intermediate plane, and the optical structure comprises a reflector substantially at the level of the intermediate plane for directing the converging beam components transversely to impinge separately on the cells of the array, and the at least one grating comprises a pair of gratings, each angled to define a beam path between the grating surface and a different region of the reflector.

49. A system as set forth in claim 48 above, wherein the multichannel control device comprises an array of transmissive spatial light modulator cells substantially centered relative to the intermediate plane along an approximate centerline, and the system includes separate optical sections on opposite sides of the centerline, wherein the at least one grating comprises at least two gratings, one on each side of the centerline, wherein the at least one concave reflector comprises at least two mirrors, one on each side of the centerline, and wherein the optical interface structure includes an optical device on each side of the for anamorphic conversion of input and output beams.

50. A system as set forth in claim 49 above, wherein the mirrors and gratings on each side of the centerline are disposed to sequentially refold beams in anamorphic patterns in successive reflections between the mirrors and grating combinations on each side, with one side serving to separate wavelength components for the cells and the other side serving to recombine wavelength components after the light modulator cells.

51. A system as set forth in claim 49 above, wherein the gratings on each side of the cells comprise single gratings at a level displaced from the level of the cells on one side thereof and angled to direct beams reflected therefrom in a selected transverse angle relative to the sagittal plane.

52. A system as set forth in claim 51 above, wherein the multichannel control device further includes angled reflectors at the level of the cells for directing beam components to the cells and optionally into or out of the beam refolding paths between the mirror and grating on each side of the cells, whereby the optical devices can be used alternatively for input or output.

53. A system as set forth in claim 50 above, wherein the gratings on each side comprise upper and lower gratings relative to the intermediate plane, each angled to cooperate with the multiply folded anamorphic patterned beam paths, whereby either grating on a side can serve to diffract a composite beam into wavelength components or recombine wavelength components into a wavelength multiplexed beam.

54. A system as set forth in claim 50 above, wherein the optical interface structure comprises separate anamorphic/collimator ports disposed in intermediate positions relative to the surface areas of the gratings, and the gratings include interior apertures in alignment with the ports and providing access into and out of the refolding paths.

55. A compact optical system for individually modifying the wavelength components of a DWDM beam comprising:
  dual and opposed reflecting structures within a circumscribing volume, said structure having both sagittal and transverse spans, a first of the structures having optical power in each of the sagittal and transverse directions, and the second of the structures being diffractive, with diffractive power in the sagittal direction;
  a wavelength component modifying subassembly mounted at a selected transverse level proximate the second of the structures, the subassembly including an array of sagitally dispersed modifying elements; and
  an input/output structure receiving the DWDM input beam and providing a modified DWDM beam as output, the input/output structure being proximate the second of the reflecting structures and including input optics at a predetermined transverse level and an angle to direct an asymmetric beam having its major dimension in the sagittal direction into an optical path reflecting at successively different transverse levels off the reflecting structure to impinge sagittally separated wavelength components on the separate elements of the array.

56. A compact optical system as set forth in claim 55 above, wherein the paths of the beams along directions between the reflecting structures are reflected from the second structure at wavelength dependent angles in the sagittal direction, and reflected from each structure at a non-zero wavelength independent angle in the transverse direction.

57. A compact optical system as set forth in claim 56 above further including optical elements for directing the modified wavelength components from the subassembly to the dual and opposed reflecting structures to recombine the wavelength components into the modified DWDM beam as an output beam.

58. A compact optical system as set forth in claim 57 above, wherein the modifying assembly comprises reflective elements, and wherein the optical elements direct the reflected wavelength components from the modifying elements back through the reflecting structures as the output beam.

59. A compact optical system as see forth in claim 57 above, wherein the modifying elements comprises transmissive elements, and where the dual and opposed reflecting structures comprise dual opposed reflecting structures, one on each side of the modifying elements, and further including an output beam collimator on one side of the modifying elements for receiving modified wavelength components transmitted through the elements and the associated one of the reflecting structures.

60. A compact optical system as set forth in claim 59 above, wherein the diffractive structures on each side of the modifying elements comprise a pair of gratings at different levels relative to the modifying structure, and the beam paths are directed to impinge on a grating at one level for diffraction and a grating on the other level for recombination.

61. A compact optical system as set forth in claim 60 above, wherein the input/output structures include an anamorphic/collimator lens disposed in the interior of at least one grating on each side.

62. A compact optical system as set forth in claim 61 above, wherein the modifying elements are disposed in a reference plane, and the pair of diffractive elements on each side comprise one above and one below the reference plane, and wherein each side of the system includes an anamorphic/collimator lens disposed within the interior region of each of the different gratings, whereby the system is operable reciprocally in different optical paths.

63. A system for modulating the intensity of individual wavelength components in an input DWDM optical beam of arbitrary polarization and channel spacings in the range of about 25–100 GHz, comprising:
  a beam refolding system having facing and spaced apart grating and concave reflector devices, the grating comprising a high line density Littrow grating and the reflector device comprising a Mangin mirror providing a convergence factor in the sagittal direction and a collimating factor in the transverse direction, with the grating and the mirror surfaces spanning substantially the same elevations in the transverse direction;
  a beam polarization splitter disposed in the path of the input before the beam refolding system;
  an input optical structure disposed adjacent the Littrow grating and directing a DWDM beam through the polarization beam splitter and toward the reflector device at a given angle of inclination in the transverse direction, the input optical structure providing an anamorphic beam having its major dimension in the sagittal direction, the Littrow grating and reflector device being configured to serially refold the anamorphic beam first into a collimated beam, second into collimated diffracted beams and third into dispersed converging diffracted beam components having beam waists at a focal plane;
  at least one polarization sensitive element in the path of the converging diffracted beam components adjacent the focal plane, and
  an array of liquid crystal cells at the focal plane, the liquid crystal cells being reflective and individually controllable to rotate the polarization direction of the beam components to selectable vectors, the at least one polarization sensitive element being oriented to reject polarization components of other than the selected vector angle, and the reflected beam components are redirected back through the beam refolding system and the beam polarization splitter.

64. A system as set forth in claim 63 above, wherein the beam polarization splitter divides the DWDM beam into orthogonally polarized components, and wherein the system further includes a waveplate device for aligning the polarization components in the same direction while maintaining equal optical path lengths.

65. A system as set forth in claim 64 above, wherein the polarization components are parallel to the lines of the Littrow grating, and wherein the beam refolding system is configured to superimpose the polarization components of the diffracted components at the focal plane, and the liquid crystal cells have nematic surfaces oriented in the same direction as the polarization components.

66. A system as set forth in claim 65 above, wherein the orthogonally polarized components are s and p components, wherein the serial refolds are at angles of inclination of less than about 5° relative to a transverse level plane, and wherein the diffracted beams are sagittally dispersed and asymmetric with a long dimension in the transverse direction.

67. A system as set forth in claim 65 above, wherein the Littrow grating has of the order of 1100 lines per mm, and wherein the Mangin mirror comprises a double Mangin set in the form of a reflective mirror having refractive and reflective faces and an interspersed transmissive element having spherical surfaces of selected curvature on each side, and wherein the s and p components diverge at ±0.5° relative to a centerline.

68. A system for separating wavelength components of an arbitrarily polarized DWDM beam having channel spacings in the range of 25 GHz to 100 GHz, and refolding the components to convergence at a local plane, and modulating the components with high efficiency and minimal polarization dependent losses comprising:

input optics receiving the DWDM beam for inputting an anamorphic beam which has a major dimension in the sagittal direction;

a beam splitting optical structure receiving the anamorphic beam from the input optics and separating polarization components in a direction transverse to the sagittal and at oppositely diverging angles relative to a median path between them, said structure including an optical rotator device for aligning both separated polarization components in the same direction and an optical element for equalizing optical path lengths for the separated components;

a beam refolding system including a polarization sensitive reflecting grating and a reflecting optical structure facing each other about a central axis, the system receiving the diverging components of the beam and sagitally dispersing the different wavelengths of the beam, wherein the grating lines of the reflecting grating are aligned with the polarization components and both substantially are transverse to the sagittal direction, and wherein the sagittal dimension of the anamorphic beam substantially fills the grating in the sagittal direction;

the beam refolding system being configured to direct the separated polarization components to a reflective focal plane, and a reflective modulator array of liquid crystal cells at the focal plane for redirection of modulated wavelength components of the sagittally dispersed beam back through the beam refolding system to recombine the different wavelengths and polarization components to form an output DWDM beam.

69. A system as set forth in claim 68 above, wherein the beam splitting optical structure includes a Wollaston prism device in the path of the input beam for separating s and p components in opposite directions at angles of less than approximately 1° each from the median path, a waveplate structure in the path of one of the diverging polarization components for rotating the polarization components into parallelism, and an optical element in the path for equalizing the optical path lengths of the components.

70. A system as set forth in claim 69 above, wherein the beam refolding system comprises a polarization sensitive grating at the Littrow angle and the reflecting optical structure comprises a Mangin mirror system with at least two lens elements.

71. A system as set forth in claim 70 above, wherein the Littrow grating has at least about 1000 lines/mm and has grating lines in the outer region from the center that are tilted up to 2° from the transverse, and wherein the Mangin mirror system comprises a first element having two spherical transmissive surfaces and a second element having two spherical surfaces, one transmissive and the other reflective.

72. A system as set forth in claim 71 above, wherein the input optics and reflective surfaces direct the beam folds to different transverse levels to form anamorphic patterns on the reflective surface of the Mangin mirror that are about 1 mm high and about 1 mm separated in the transverse dimension, and wherein the beam path between reflecting surfaces is less than about 120 mm.

73. A system as set forth in claim 68 above, wherein the reflective modulator array comprises a plurality of zero twist nematic liquid crystal cells for modifying the polarization states of the beam components and polarization sensitive optics in the path of the reflected beams for rejecting portions in accordance with the modified polarization state.

74. An optical system for individually attenuating or extinguishing individual wavelength components of a DWDM signal, comprising:

a temperature stable housing of low thermal coefficient of expansion material defining a volume for multiple reflecting beam pairs;

an optical input/output device mounted in the housing and receiving the DWDM signal and having optical power for inputting an anamorphic beam having its major dimension in a sagittal plane and minor dimension in a transverse piane;

a concave Mangin mirror structure disposed about an optical centerline in the housing at a given focal length from the input/output device and having optical power in the sagittal and transverse directions to collimate the incident beam;

a reflective Littrow grating disposed in the housing about the optical centerline at a given focal length from and facing the Mangin mirror, the Littrow grating having grating lines aligned substantially with the transverse direction to reflect the incident beam as first order diffracted beam components in wavelength dependent distribution in the sagittal direction and at an angle to impinge on the Mangin mirror at a level that reflects back a converging beam of sagittally dispersed wavelength components to a different level with the wavelength components having greater transverse dimension than sagittal dimension and spacing;

a reflective modulating structure for the individual wavelength components proximate the grating and in the plane in the path of the converging wavelength components, the modulating structure comprising a linear plurality of voltage driven reflective liquid crystal cells, each in the path of a different diffracted beam component, and the modulator structure being disposed to reflect dispersed wavelength beam components back from the modulating structure to be rediffracted onto a composite beam from the grating and reflected back to the input/output device.

75. A system as set forth in claim 74 above, wherein the Mangin mirror and Littrow grating form a low numerical aperture, short focal length system, wherein the grating has approximately 1100 lines/mm, wherein the beam impinging on the grating substantially fills the grating in the sagittal direction, wherein the Mangin mirror comprises a pair of lenses with a reflecting surface at one limit thereof and wherein the modulating structure is at the focal plane of the converging dispersed wavelength components at the position of the beam waists therein.

76. An optical system as set forth in claim 75 above, wherein the anamorphic beam has a dimension in the transverse plane of the reflecting surface of the Mangin mirror of approximately 1 mm, and wherein the multiple reflecting beam path folds within a total transverse dimension of less than about 20 mm.

77. An optical system as set forth in claim 76 above, wherein the reflective wavelength component modulating structure further includes a plurality of voltage driver circuits, each coupled to a different one of the liquid crystal cells wherein the modulating structure includes polarization sensitive elements in the path of reflected wavelength components for rejecting portions of the components as determined by the modulation, and wherein the optical path for directing reflected diffracted beam components provides a series of beam folds between the Mangin mirror and the Littrow grating in substantially a reverse direction to the input elliptical beam.

78. An optical system as set forth in claim 77 above, wherein the input/output device comprises an anamorphic/collimator lens coupled into both the input path and the reverse path, and an optical circulator coupled to the anamorphic/collimator lens for separating input from the output beams.

79. An optical system as set forth in claim 77 above, where the input/output devices comprise a separated anamorphic input lens and collimator output lens, and wherein said input lens and output lens are disposed at different transverse levels, and the liquid crystal cells are tilted in the transverse direction to direct the reverse path at different transverse levels such that the recombined beam impinges on the output collimator lens.

80. An optical system as set forth in claim 74 above, wherein the temperature stable housing is hermetically sealed and wherein the internal atmosphere within the housing is adjusted in pressure and constituents to period tune the diffracted beam component wavelengths.

81. An optical system for individually attenuating or extinguishing individual wavelength components of a DWDM signal, comprising:
 a temperature stable housing of low thermal coefficient of expansion material defining a volume for multiple reflecting beam paths;
 an optical input/output device receiving the DWDM signal and having optical power for inputting an elliptical beam having its major dimension in a sagittal plane and minor dimension in a transverse plane;
 a concave mirror system including a first concave mirror disposed in the housing at a given focal length from the input/output device and having optical power in the sagittal and transverse dimensions to collimate the incident beam in those dimensions;
 a first grating at the Littrow angle disposed in the housing at a given focal length from the first concave mirror, said first Littrow grating having grating elements aligned with the transverse direction to reflect the incident beam in a wavelength dependent distribution in the sagittal plane as first order diffracted beam components which are at an angle to impinge on the concave mirror at a predetermined level such that the mirror reflects back a converging pattern to a different level, with the dispersed beam components being substantially collimated in the transverse direction;
 a transmissive dispersed beam component modulating structure on the same side of the housing as the Littrow grating and in the path of the converging dispersed beam components in the different level, the modulating structure comprising a linear plurality of voltage driven transmissive liquid crystal cells, each in the path of a different dispersed beam component;
 a second concave mirror disposed in the housing at the same side thereof as the first concave mirror system and having like optical properties;
 a second grating at the Littrow angle disposed in the housing at the same side as the first Littrow grating and having like optical properties, and
 reflective elements disposed in a plane intermediate between the predetermined level and the different level for directing converging dispersed beam components to the cells of the modulating structure and diverging diffracted beam components after attenuation through the optical path defined by the second concave mirror and the second Littrow grating, back to the input/output device.

82. An optical system as set forth in claim 81 above, wherein the input/output device includes an input lens disposed within the interior of the first Littrow grating and an output lens disposed within the interior of the second Littrow grating.

83. An optical system as set forth in claim 81 above, wherein the first Littrow grating comprises a split grating having sections at different levels relative to the intermediate plane and the second Littrow grating also comprises a split grating having grating sections at different levels relative to the intermediate plane.

84. An optical system as set forth in claim 83 above, wherein the input/output devices comprise input/output lenses disposed in the interior of each of the grating sections such that four ports are available for input and/or output usage.

85. For a system employing a diffractive assembly to separate DWDM signal communication beams, the combination of:
 a beam collimator receiving the DWDM signal; an anamorphic converter coupled to receive collimated signals from the collimator and to provide an anamorphic beam output having a high sagittal to transverse ratio, the anamorphic output having a beam waist at a distance from the exit of the converter, and
 a polarization sensitive separator intercepting the beam waist of the anamorphic beam and providing output beams of orthogonally polarized components therefrom.

86. A combination as set forth in claim 85 above, wherein the polarization responsive separator comprises optical elements disposed to separate s polarization components from p polarization components with an angle of divergence of about 1° or less.

87. A combination as set forth in claim 86 above, wherein the polarization separator device comprises a Wollaston prism device having a pair of optical wedges, and an air space therebetween, and the beam waist from the anamorphic converter exit is within the air space region.

88. A combination as set forth in claim 87 above, wherein the polarization sensitive device comprises a Wollaston beamsplitter having two pairs of oppositely tapered birefringent wedges disposed serially relative to an optical path area and including a half waveplate disposed between the two pairs of wedges.

89. A combination as set forth in claim 86 above, wherein the diffractive assembly includes grating lines substantially along a selected direction, and the combination further includes a polarization rotation element in the path of one of the wavelength component beams and a path length equalizer element in the path of the other wavelength component beams.

90. A combination as set forth in claim 85 above, wherein the anamorphic converter includes three serially disposed lenses each having power in a given direction.

91. The method of controlling individual optical beams of different wavelengths in a WDM beam to provide high resolution, low crosstalk and high extinction comprising the steps of:

diverging in input WDM beam into a beam of two dimensional cross-section that is substantially greater in a first dimension than in a second orthogonal dimension, diffractively dispersing the wavelength components through the first dimension while maintaining the wavelength components substantially collimated in the second dimension, to provide physically spaced, spectrally separate beam components longer in the second dimension than the first;

individually adjusting the intensities of the wavelength components by modifying the polarization thereat while reflecting the beam components, rejecting components in the reflected beam components from the intensity adjusted components;

diffractively recombining the intensity adjusted wavelength components into a collimated beam that is substantially greater in a first dimension than in a second, orthogonal dimension, and converging the recombined beam to an output WDM beam.

92. The method of claim 91 above, further including the steps of diverging the input beam into an anamorphic pattern having like oriented spaced apart polarization components concurrently collimating the anamorphic pattern by reflective and refractive optical correction, distributing the collimated anamorphic pattern by reflective and refractive optical correction, distributing the collimated anamorphic pattern in a direction to provide maximum resolution during diffraction, individually adjusting the beams by variably retarding each pair of components, varying the intensities by rejecting beam components in accordance with the retardation, diffractively recombining the adjusted wavelength components while counterpropagating the beams, and reforming the state of polarization of the output WDM beam.

93. A system for deriving separate combinations of modulated wavelength outputs from a DWDM input optical beam comprising:

an input/output structure receiving the input beam, and including at least two parallel collimators separated by a predetermined distance to define at least two parallel beam paths, anamorphic converter lenses adjacent the at least two parallel collimators and intercepting the beam paths, and a high numerical aperture beam splitter adjacent the anamorphic converter lenses and intercepting the beam paths;

a diffractive Fourier beam refolding system receiving the input beam and providing a plurality of spatially dispersed wavelength components converging toward a focal plane; and a wavelength component modulating array of reflective cells receiving the individual wavelength components, the cells modulating the wavelength components by varying the polarization thereof, and including at least one polarization beam displacer for diverting wavelength polarization components of a selected direction by the predetermined distance for return via one of the beam paths to a selected collimator in the input/output structure via the beam refolding system.

94. A system as set forth in claim 93 above, wherein the input beam is provided to one beam path and the diverted reflected signals are returned via the other beampath.

95. A system as set forth in claim 93 above, wherein the input beam is provided to one beam path and modulated signals are returned on the same beam path while diverted signals are returned on the other beam path.

96. A system as set forth in claim 93 above, wherein the at least two collimators are each 1 mm O.D. collimators, separated by about 1 mm, and wherein the at least one polarization beam displacer comprises two polarization beam displacers in series of equal optical path length and birefringence to separate modulated components from diverted components by about 1 mm.

97. An optically stable fiber-coupled spectrometer comprising:

an optical spectrometer receiving an input beam containing multiple wavelengths and providing a wavelength dispersed output beam and including at least one stationary modulator element at an object plane, the spectrometer transferring at least one wavelength of the input beam to the at least one modulator element and back as an output beam;

a circuit for modifying the instantaneous state of the modulator element, and an input/output system coupled to the spectrometer and including an input fiber both providing the input beam and receiving the output beam and optical elements coupling the input fiber to the spectrometer and including elements coupled to the input fiber and arranged such that minor errors in angular or positional locations of the input and output beams nominally have no effect on fiber coupling efficiency.

98. A spectrometer as set forth in claim 97 above, wherein the optical elements include a shared collimator coupled to both launch the input beam and receive the output beam, and wherein the spectrometer further includes an optical circulator coupled to the input fiber for separating the input beam from the output beam.

\* \* \* \* \*